US008909122B2

(12) United States Patent
Gotoh et al.

(10) Patent No.: US 8,909,122 B2
(45) Date of Patent: Dec. 9, 2014

(54) LUBRICANT SUPPLYING DEVICE, IMAGE FORMING APPARATUS, AND PROCESS CARTRIDGE

(71) Applicants: Ryohta Gotoh, Tokyo (JP); Satoshi Hatori, Kanagawa (JP); Naohiro Kumagai, Kanagawa (JP); Akira Fujimori, Kanagawa (JP); Kaoru Yoshino, Tokyo (JP); Hideyasu Seki, Kanagawa (JP)

(72) Inventors: Ryohta Gotoh, Tokyo (JP); Satoshi Hatori, Kanagawa (JP); Naohiro Kumagai, Kanagawa (JP); Akira Fujimori, Kanagawa (JP); Kaoru Yoshino, Tokyo (JP); Hideyasu Seki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 74 days.

(21) Appl. No.: 13/847,556

(22) Filed: Mar. 20, 2013

(65) Prior Publication Data
US 2013/0279923 A1 Oct. 24, 2013

(30) Foreign Application Priority Data

Mar. 22, 2012 (JP) ................................. 2012-065181
Apr. 12, 2012 (JP) ................................. 2012-091004

(51) Int. Cl.
*G03G 21/00* (2006.01)

(52) U.S. Cl.
USPC .......................................................... 399/346

(58) Field of Classification Search
CPC . G03G 15/168; G03G 15/2075; G03G 21/00; G03G 2215/2093; F16N 15/00; F16N 29/00; F16N 29/04; F16N 2270/20
USPC ......... 399/24, 324, 325, 346; 427/11; 401/49, 401/81; 118/76, 256, 263, DIG. 1
See application file for complete search history.

(56) References Cited

U.S. PATENT DOCUMENTS

2007/0059067 A1 3/2007 Tanaka et al.
2007/0068738 A1 3/2007 Kawahara et al.
(Continued)

FOREIGN PATENT DOCUMENTS

| JP | 08-314346 | 11/1996 |
| JP | 2007-293240 | 11/2007 |
| JP | 2010-271665 | 12/2010 |
| JP | 2012155348 A * | 8/2012 |

OTHER PUBLICATIONS

U.S. Appl. No. 13/790,017, filed Mar. 8, 2013, Hatori, et al.
U.S. Appl. No. 13/827,444, filed Mar. 14, 2013, Fujimori, et al.

(Continued)

*Primary Examiner* — Robert Beatty
(74) *Attorney, Agent, or Firm* — Oblon, Spivak, McClelland, Maier & Neustadt, L.L.P.

(57) ABSTRACT

A lubricant supplying device includes: lubricant; a supplying member; a housing case; a pushing mechanism that includes a pair of swing members supported swingably in the housing case and a biasing unit urging the pair of swing members to swing; and a remaining amount detecting unit that detects that a remaining amount of the lubricant is equal to or smaller than a predetermined amount. The remaining amount detecting unit includes: first detection members provided at respective positions different from respective sliding areas of the member on which the swing members slide, on which sliding areas the respective swing members slide, and second detection members attached to the respective swing members such that the second detection members abut or face the respective first detection members when swing postures of the respective swing members reach respective swing postures corresponding to that the remaining amount of the lubricant is the predetermined amount.

11 Claims, 17 Drawing Sheets

(56) References Cited

U.S. PATENT DOCUMENTS

| | | |
|---|---|---|
| 2007/0172273 A1 | 7/2007 | Harada et al. |
| 2007/0258743 A1 | 11/2007 | Shakuto et al. |
| 2008/0181689 A1 | 7/2008 | Fujimori |
| 2009/0060600 A1 | 3/2009 | Ninomiya et al. |
| 2009/0103994 A1 | 4/2009 | Miyanaga |
| 2010/0183349 A1 | 7/2010 | Shintani et al. |
| 2011/0076075 A1 | 3/2011 | Arai et al. |
| 2011/0123239 A1 | 5/2011 | Azeyanagi et al. |
| 2011/0170908 A1 | 7/2011 | Saitoh et al. |
| 2011/0217101 A1 | 9/2011 | Okamoto et al. |
| 2011/0229232 A1* | 9/2011 | Kojima et al. ............... 399/346 |
| 2012/0234188 A1 | 9/2012 | Kawahara et al. |
| 2013/0243449 A1* | 9/2013 | Hatori et al. ............... 399/24 |
| 2013/0251380 A1* | 9/2013 | Fujimori et al. ............... 399/24 |
| 2013/0251381 A1* | 9/2013 | Seki et al. ............... 399/24 |
| 2013/0251382 A1* | 9/2013 | Honjoh et al. ............... 399/25 |
| 2014/0037302 A1* | 2/2014 | Gotoh et al. ............... 399/24 |
| 2014/0037303 A1* | 2/2014 | Tomita et al. ............... 399/24 |
| 2014/0037304 A1* | 2/2014 | Uenishi et al. ............... 399/24 |

OTHER PUBLICATIONS

U.S. Appl. No. 13/848,307, filed Mar. 21, 2013, Seki, et al.

* cited by examiner

LUBRICANT SUPPLYING DEVICE, IMAGE FORMING APPARATUS, AND PROCESS CARTRIDGE

CROSS-REFERENCE TO RELATED APPLICATIONS

The present application claims priority to and incorporates by reference the entire contents of Japanese Patent Application No. 2012-065181 filed in Japan on Mar. 22, 2012 and Japanese Patent Application No. 2012-091004 filed in Japan on Apr. 12, 2012.

BACKGROUND OF THE INVENTION

1. Field of the Invention

The present invention relates to a lubricant supplying device, an image forming apparatus, and a process cartridge.

2. Description of the Related Art

In image forming apparatuses such as printers, facsimiles, and copying machines, the image forming apparatuses have been known that include lubricant supplying devices supplying lubricant to surfaces of image carriers for protection or reducing friction of photosensitive elements and intermediate transfer belts serving as image carriers (e.g., Japanese Patent Application Laid-open No. 2007-293240).

FIGS. 28A and 28B are schematic structural views of a lubricant supplying device described in Japanese Patent Application Laid-open No. 2007-293240. FIG. 28A illustrates a state at the beginning of use. FIG. 28B illustrates a state at which solid lubricant 162 is exhausted. FIGS. 28A and 28B illustrate a structure on one end side in a longitudinal direction of the solid lubricant 162. The other end side also has the same structure. As illustrated in FIG. 28A, the lubricant supplying device described in Japanese Patent Application Laid-open No. 2007-293240 includes a supplying member 161 that abuts the solid lubricant 162 having a bar shape, scrapes the solid lubricant 162 by making a sliding contact with and rubbing the solid lubricant 162, and supplies the powdered lubricant after the scraping to an image carrier. In addition, the lubricant supplying device includes a lubricant holding member 164 holding the side, which is opposite the side at which the solid lubricant 162 abuts the supplying member 161, of the solid lubricant 162. The lubricant holding member 164 is housed in a case 165 of the lubricant supplying device such that the lubricant holding member 164 can move in an approaching-and-distancing direction of the solid lubricant 162 relative to the supplying member 161. Furthermore, in a space on the side, which is opposite the side at which the lubricant holding member 164 holds the solid lubricant 162, of the lubricant holding member 164 in the case 165, a pushing mechanism 163 is provided that pushes the side, which is opposite the side at which the lubricant holding member 164 holds the solid lubricant 162, of the lubricant holding member 164 toward the supplying member 161.

The pushing mechanism 163 has a pair of swing members 163A, one end side of each of which is provided on the lubricant holding member 164 in a swingable manner, disposed symmetrically about the center in the longitudinal direction of the solid lubricant 162 (the swing member 163A on the other end side in the longitudinal direction of the lubricant holding member 164 is not illustrated). Respective both ends of a spring 163C serving as a biasing unit are attached to the swing members 163A. Each swing member 163A receives from the spring 163C a biasing force acting toward the center in the longitudinal direction of the lubricant holding member 164 as illustrated with arrow D in FIG. 28A.

The biasing force urges the other end side (hereinafter referred to as a swing end) of each swing member 163A to leave from the lubricant holding member 164 as illustrated in FIG. 28A, resulting in the swing end abutting a surface 165A facing the lubricant holding member 164 of the case 165. The lubricant holding member 164 abuts the supplying member 161 with a certain abutting force by being pushed toward the supplying member 161 by a reaction force of a pushing force of the swing members 163A (force acting downward in FIG. 28A) applied to the surface 165A of the case 165.

With the rotation of the supplying member 161, the supplying member 161 makes a sliding contact and rubs the solid lubricant 162, which abuts the supplying member 161. Lubricant scraped from the solid lubricant 162 by the sliding contact and rubbing and stuck to the supplying member 161 is applied to a surface of the image carrier. As the solid lubricant 162 is gradually scraped by the sliding contact and rubbing of the supplying member 161, the swing members 163A swing, resulting in the lubricant holding member 164 moving toward the supplying member 161 as illustrated in FIG. 28B. The solid lubricant 162 continues to abut the supplying member 161 from the beginning to an end stage of use, thereby enabling the supplying member 161 to scrape the solid lubricant 162 well.

When image forming operation is performed without supply of lubricant, an image carrier is damaged by being worn because there is no protective effect of the lubricant. Thus, it is necessary to detect that an amount of remaining lubricant is small (detect a near-end) and replace the lubricant with new lubricant. The inventors of the present invention prototyped a lubricant supplying device as illustrated in FIG. 29 (hereinafter referred to as the prototype).

As illustrated in FIG. 29, in the prototype, a first electrode member 171 serving as a first detection member is provided at a position in a sliding area S, on which the swing member 163A slides, of the surface 165A facing the lubricant holding member 164 of the case 165. The swing member 163A abuts the position when the remaining amount of the solid lubricant 162 is small. A second electrode member 172 serving as a second detection member is provided at a position in an abutting area 163A of the swing member 163A abutting the sliding area S of the case 165. The swing member 163A abuts the position when the remaining amount of the solid lubricant 162 is small (near-end).

In the prototype, when the remaining amount of the solid lubricant 162 is small (near-end), the second electrode member 172 provided in an abutting area 163B of the swing member 163A abuts the first electrode member 171 provided in the sliding area S of the case 165. As a result, conduction is established between the first electrode member 171 and the second electrode member 172 and a current flows between the electrode members 171 and 172. This current enables a detection unit 173 to detect the near-end of the solid lubricant 162.

In the prototyped lubricant supplying device, however, a new problem arose in that the lubricant was not applied uniformly on the surface of the image carrier in some cases. Specifically, the lubricant holding member 164 is housed in the case 165 with a certain amount of backlash therebetween because the lubricant holding member 164 needs to be allowed to move inside the case 165. As a result, the position of the lubricant holding member 164 shifts in the longitudinal direction of the solid lubricant 162 during use in some cases. The shift in the position of the lubricant holding member 164 in the longitudinal direction causes the swing member 163A attached swingably to the lubricant holding member 164 to shift in the longitudinal direction. As a result, the swing member 163A abuts the first electrode member 171 of the case 165 at a different position in the abutting area 163B from the position at which the second electrode member 172 is provided. Sliding resistance differs when the swing member 163A slides on the internal surface of the case 165 and when the swing member 163A slides on the surface of the first electrode member 171 of the case 165 because a friction coefficient differs between the first electrode member 171 provided on the case 165 and to the case 165. As a result, the sliding resistance differs between the swing member 163A on one side, which slides on the first electrode member 171, and the swing member 163A on the other side, which slides on the case 165, resulting in a swing amount of the swing member 163A differing between one side and the other side. This difference disables the solid lubricant 162 to abut the supplying member 161 with uniform abutting pressure in the longitudinal direction, thereby causing an amount of the lubricant scraped by the supplying member 161 to differ in the longitudinal direction. As a result, the lubricant cannot be applied uniformly on the surface of the image carrier.

In view of the above, there is a need to provide a lubricant supplying device that can detect that a remaining amount of lubricant is small and can prevent non-uniformity of an amount of the lubricant supplied to a supply target caused by the swing member sliding on the first detection member, an image forming apparatus using the lubricant supplying device, and a process cartridge using the lubricant supplying device.

SUMMARY OF THE INVENTION

It is an object of the present invention to at least partially solve the problems in the conventional technology.

A lubricant supplying device includes: lubricant; a supplying member that supplies the lubricant to a lubricant supply target; a housing case that houses the lubricant; a pushing mechanism that includes a pair of swing members supported swingably in the housing case and a biasing unit urging the pair of swing members to swing, and in which the swing members swing while sliding on an inner surface of the housing case by a biasing force of the biasing unit to push the lubricant to the supplying member; and a remaining amount detecting unit that detects that a remaining amount of the lubricant is equal to or smaller than a predetermined amount. The remaining amount detecting unit includes: first detection members provided at respective positions different from respective sliding areas of the member on which the swing members slide, on which sliding areas the respective swing members slide, and second detection members attached to the respective swing members such that the second detection members abut or face the respective first detection members when swing postures of the respective swing members reach respective swing postures corresponding to that the remaining amount of the lubricant is the predetermined amount.

An image forming apparatus includes: an image carrier; and a lubricant supplying unit that supplies lubricant on a surface of the image carrier. The lubricant supplying unit is a lubricant supplying device includes: lubricant; a supplying member that supplies the lubricant to a lubricant supply target; a housing case that houses the lubricant; a pushing mechanism that includes a pair of swing members supported swingably in the housing case and a biasing unit urging the pair of swing members to swing, and in which the swing members swing while sliding on an inner surface of the housing case by a biasing force of the biasing unit to push the lubricant to the supplying member; and a remaining amount detecting unit that detects that a remaining amount of the lubricant is equal to or smaller than a predetermined amount. The remaining amount detecting unit includes: first detection members provided at respective positions different from respective sliding areas of the member on which the swing members slide, on which sliding areas the respective swing members slide; and second detection members attached to the respective swing members such that the second detection members abut or face the respective first detection members when swing postures of the respective swing members reach respective swing postures corresponding to the remaining amount of the lubricant is the predetermined amount.

A process cartridge includes: an image carrier; and a lubricant supplying unit that supplies lubricant to a surface of the image carrier. The process cartridge is attachable to and detachable from an image forming apparatus body. The lubricant supplying unit is a lubricant supplying device includes: lubricant; a supplying member that supplies the lubricant to a lubricant supply target; a housing case that houses the lubricant; a pushing mechanism that includes a pair of swing members supported swingably in the housing case and a biasing unit urging the pair of swing members to swing, and in which the swing members swing while sliding on an inner surface of the housing case by a biasing force of the biasing unit to push the lubricant to the supplying member; and a remaining amount detecting unit that detects that a remaining amount of the lubricant is equal to or smaller than a predetermined amount. The remaining amount detecting unit includes: first detection members provided at respective positions different from respective sliding areas of the member on which the swing members slide, on which sliding areas the respective swing members slide; and second detection members attached to the respective swing members such that the second detection members abut or face the respective first detection members when swing postures of the respective swing members reach respective swing postures corresponding to the remaining amount of the lubricant is the predetermined amount.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

Figure 1:
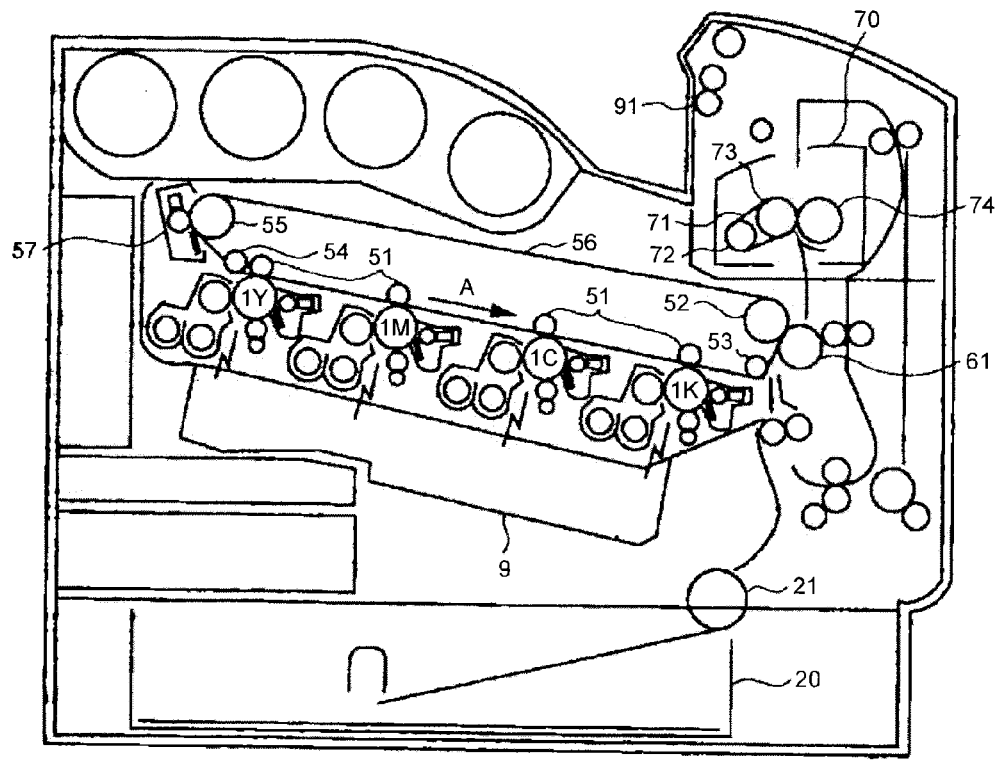
FIG. 1 is a schematic structural view illustrating a printer according to a first embodiment of the invention.

An embodiment in which the invention is applied to a printer serving as an electrophotographic image forming apparatus is described below. FIG. 1 is a schematic structural view illustrating a printer according to the embodiment. The printer includes an intermediate transfer belt 56 serving as an intermediate transfer body and an image carrier at about a central portion therein. The intermediate transfer belt 56 is an endless belt having a mid-resistance base made of a heat resistance material such as polyimide or polyamide, winded along and supported by four rollers 52, 53, 54, and 55, and is driven to rotate in a direction of arrow A in FIG. 1. Under the intermediate transfer belt 56, four image forming units corresponding to respective colors of yellow (Y), magenta (M), cyan (C), and black (K) are arranged along a surface of the intermediate transfer belt 56.

Figure 2:
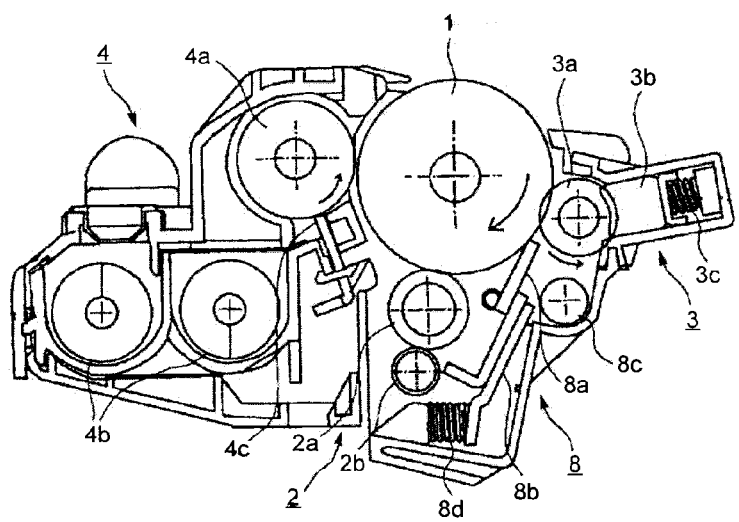
FIG. 2 is an enlarged schematic diagram illustrating one of four image forming units.

FIG. 2 is an enlarged schematic diagram illustrating one of the four image forming units. Each image forming units has the same structure. Thus, the indexes indicating the respective colors of Y, M, C, and K are omitted. Each image forming unit has a photosensitive element 1 serving as an image carrier. Around the photosensitive element 1, a charging device 2 that serves as a charging unit uniformly charging a surface of the photosensitive element 1 to have a desired potential (negative polarity), a developing device 4 that serves as a developing unit developing a latent image formed on the surface of the photosensitive element 1 with toner of a corresponding color of the respective colors charged to a negative polarity and forming a toner image, a lubricant applying device 3 that serves as a lubricant supplying unit supplying lubricant to the surface of the photosensitive element 1 by applying the lubricant to the surface, and a cleaning device 8 that cleans the surface of the photosensitive element 1 after the toner image is transferred are arranged.

The image forming unit is structured as a process cartridge that is attachable to and detachable from the image forming apparatus. Thus, the photosensitive element 1, the charging device 2, the developing device 4, the cleaning device 8, and the lubricant applying device 3 are attached to or detached from the image forming apparatus at once.

As illustrated in FIG. 1, an exposing device 9 that serves as a static latent image forming unit exposing the charged surfaces of the respective photosensitive element 1 on the basis of image data of the respective colors to drop potential of the exposed areas and to form static latent images is provided under the image forming units. Primary transfer rollers 51 that serve as a transfer unit primarily transferring toner images formed on the respective photosensitive elements 1 onto the intermediate transfer belt 56 are arranged at respective positions facing the corresponding photosensitive elements 1 with the intermediate transfer belt 56 interposed therebetween. The primary transfer rollers 51 connect to a power supply (not illustrated), which supplies a certain voltage to the primary transfer rollers 51.

A secondary transfer roller 61 serving as a secondary transfer member makes contact with the intermediate transfer belt 56 with pressure at a position opposite the roller 52 with the intermediate transfer belt 56 interposed therebetween. The secondary transfer roller 61 connects to a power supply (not illustrated), which supplies a certain voltage to the secondary transfer roller 61. An area in which the secondary transfer roller 61 and the intermediate transfer belt 56 make contact with each other is a secondary transfer area, in which a toner image on the intermediate transfer belt 56 is transferred to a transfer sheet serving as a recording material. An intermediate transfer belt cleaning device 57 is disposed at a position opposite the roller 55 with the intermediate transfer belt 56 interposed therebetween and cleans the surface of the intermediate transfer belt 56 after the secondary transfer. Above the secondary transfer area, a fixing device 70 is provided that fixes the toner image, which is transferred on the transfer sheet, on the transfer sheet. The fixing device 70 includes a heating roller 72 having a halogen heater therein, an endless fixing belt 71 winded between the heating roller 72 and a fixing roller 73, and a pressing roller 74 that is disposed opposite the fixing roller 73 with the fixing belt 71 interposed therebetween and makes contact with the fixing roller 73 with pressure. At lower area of the printer, a paper feeding device 20 is provided that feeds transfer sheets placed in the paper feeding device 20 toward the secondary transfer area.

The photosensitive element 1, which is an organic photosensitive element, has a surface protective layer formed with a polycarbonate resin. The charging device 2 includes a roller charging device 2a as a charging member composed of a conductive cored bar and a mid-resistance elastic layer coating the outer periphery of the conductive cored bar. The roller charging device 2a connects to a power supply (not illustrated), which supplies a certain voltage to the roller charging device 2a. The roller charging device 2a is disposed so as to have a tiny gap between itself and the photosensitive element 1. The tiny gap can be provided by winding a spacer having a fixed thickness on non-image forming areas at both ends of the roller charging device 2a and by abutting a surface of the spacer to the surface of the photosensitive element 1, for example. The roller charging device 2a is provided with a charge cleaning member 2b that makes contact with and cleans the surface of the roller charging device 2a.

In the developing device 4, a developing sleeve 4a that includes a magnetic field generation unit therein and serves as a developer carrier is disposed at a position facing the photosensitive element 1. Under the developing sleeve 4a, two screws 4b are provided that mix toner supplied from a toner bottle (not illustrated) with developer and scoop the mixture to the developing sleeve 4a while stirring the mixture. The developer containing toner and magnetic carrier scooped by the developing sleeve 4a is regulated by a doctor blade 4c so as to form a developer layer having a certain thickness and thereafter carried by the developing sleeve 4a. The developing sleeve 4a moves in the same direction as the photosensitive element 1 at the position at which the developing sleeve 4a encounters the photosensitive element 1 and carries and conveys the developer, supplying toner to a static latent image on the photosensitive element 1. FIG. 1 illustrates the structure of the developing device 4 employing a two-component developing method. The developing device 4, however, is not limited to employing the method. A developing device employing a one-component developing method is also applicable.

The lubricant applying device 3 includes solid lubricant 3b housed in a fixed case and an applying roller 3a that is a supplying member included in an applying unit applying powdered lubricant scraped from the solid lubricant 3b to a surface of the photosensitive element 1. Examples of the roller that can be used as the applying roller 3a include a brush roller and a urethane foam roller. When the brush roller is used as the applying roller 3a, a brush roller is preferable that is made of a material obtained by adding a resistance control material such as carbon black to resin such as nylon or acrylic and by being adjusted to have a volume resistivity between $1 \times 10^3$ Ωcm to $1 \times 10^8$ Ωcm inclusive. The applying roller 3a rotates in a co-rotational direction with the rotational direction of the photosensitive element 1. When the urethane foam roller is used as the applying roller 3a, a polyurethane foam roller can be used.

The solid lubricant 3b is formed in a cuboid shape and is pushed toward the applying roller 3a by a pushing mechanism 3c, which is described later. Lubricant containing at least a fatty acid metal salt is used as the lubricant of the solid lubricant 3b. Examples of the fatty acid metal salt include a fluorine series resin, fatty acid metal salt having a lamella crystal structure such as zinc stearate, calcium stearate, barium stearate, aluminum stearate, and magnesium stearate, lauroyl lysine, sodium zinc salt of monocetyl phosphate ester, and calcium lauroyl taurine. Among the examples of the fatty acid metal salt, zinc stearate is particularly preferably used. It is because zinc stearate has very good extensibility on the surface of the photosensitive element 1 and low moisture absorbency, and furthermore its lubricity hardly deteriorates even when humidity changes. Accordingly, a protective lubricant film layer can be formed that is hardly affected by environmental change and has a high ability of protecting a surface of a photosensitive element, thereby enabling the surface of the photosensitive element to be protected well. In addition, zinc stearate can markedly reduce cleaning defects because its lubricity hardly deteriorates. In addition to the fatty acid metal salts, liquid materials such as silicone oils, fluorochemical oils, natural waxes and gaseous materials can be added as external additives.

The lubricant of the solid lubricant 3b preferably contains boron nitride, which is inorganic lubricant. Boron nitride can take different crystal structures, including hexagonal boron nitride (h-BN) in a low pressure phase and cubic boron nitride (c-BN) in a high pressure phase. A crystal of hexagonal boron nitride in a low pressure phase has a layered structure and is readily cleaved. Its friction coefficient can be kept smaller than about 0.2 up to at nearly 400° C. In addition, boron nitride hardly changes its characteristics by being subjected to discharge and does not loose lubricity even if it is subjected to discharge while other lubricant loses lubricity. The addition of such boron nitride prevents the lubricant formed on the surface of the photosensitive element 1 as a thin film by being supplied thereon from deterioration in a short period of time due to discharge occurring when the charging device 2 or the primary transfer rollers 51 operates. Boron nitride hardly changes its characteristic by discharge and does not lose lubricity even if it is subjected to discharge while other lubricant loses lubricity. In addition, boron nitride prevents a photosensitive element layer of the photosensitive element 1 from being oxidized or evaporated by discharge. The addition of boron nitride, which demonstrates its lubricity with a small additive amount, is effective for preventing failures due to the sticking of lubricant to the roller charging device 2a and noises caused by vibration of a cleaning blade 8a.

The solid lubricant 3b of the embodiment is made by compression forming of a lubricant material containing zinc stearate and boron nitride. The forming method of the solid lubricant 3b is not limited to this method. Other forming methods such as melting may be employed. As a result, the solid lubricant 3b can obtain both of the effect of zinc stearate and the effect of boron nitride.

The solid lubricant 3b consistently abuts the applying roller 3a by being pushed by the pushing mechanism 3c while the thickness of the solid lubricant 3b is temporally reduced by being scraped by the applying roller 3a. The applying roller 3a applies the scraped lubricant to the surface of the photosensitive element 1 while rotating. Thereafter, the lubricant applied to the surface of the photosensitive element 1 makes contact with the cleaning blade 8a, and is formed as a thin film by being pushed and extended by the cleaning blade 8a. As a result, the friction coefficient of the surface of the photosensitive element 1 is reduced. The film of the lubricant adhering on the surface of the photosensitive element 1 has a very small thickness and thus does not hinder the charging by the roller charging device 2a.

The cleaning device 8 includes the cleaning blade 8a serving as a cleaning member, a supporting member 8b, a toner collection coil 8c, and a blade pushing spring 8d. The cleaning blade 8a is made by forming rubber such as urethane rubber or silicone rubber in a platy shape. The cleaning blade 8a is disposed in such a manner that its edge abuts the surface of the photosensitive element 1 and removes toner remaining on the surface of the photosensitive element 1 after transfer. The cleaning blade 8a is adhesively attached to and supported by the supporting member 8b made of metal, plastic, or ceramic, for example. The cleaning blade 8a is disposed at a certain angle with respect to the surface of the photosensitive element 1. In addition, the cleaning blade 8a abuts the surface of the photosensitive element 1 with certain pressure and a certain intrusion amount by the blade pushing spring 8d. Any of known cleaning supplies such as a cleaning brush can be used as the cleaning member besides the cleaning blade.

In the embodiment, the lubricant applying device 3 is disposed downstream from the position at which the photosensitive element 1 faces the primary transfer roller 51 (primary transfer area) and upstream from the cleaning device 8 in the surface moving direction of the photosensitive element 1. This disposition enables lubricant applied to the surface of the photosensitive element 1 by the lubricant applying device 3 to be extended by the cleaning blade 8a making a sliding contact with and rubbing the surface of the photosensitive element 1, thereby enabling uneven thicknesses of the lubricant applied to the surface of the photosensitive element 1 to be roughly uniformed. Alternatively, the lubricant applying device 3 may be disposed downstream from the position at which the photosensitive element 1 faces the cleaning device 8 (cleaning position) and upstream from the position at which the photosensitive element 1 faces the charging device 2 (charging position) in the surface moving direction of the photosensitive element 1. In this case, when a neutralization unit that neutralizes the surface of the photosensitive element before the charging processing by the charging device 2 is provided, the lubricant applying device 3 is disposed upstream from the position at which the photosensitive element 1 faces the neutralization unit (neutralization position). In the embodiment, the lubricant applying device 3 is provided in the cleaning device 8. As a result, toner adhering to the applying roller 3a when the applying roller 3a makes a sliding contact with and rubs the photosensitive element 1 can be shaken off by the solid lubricant 3b or a flicker (not illustrated) and readily collected by the toner collection coil 8c together with toner collected by the cleaning blade 8a.

Figure 3:
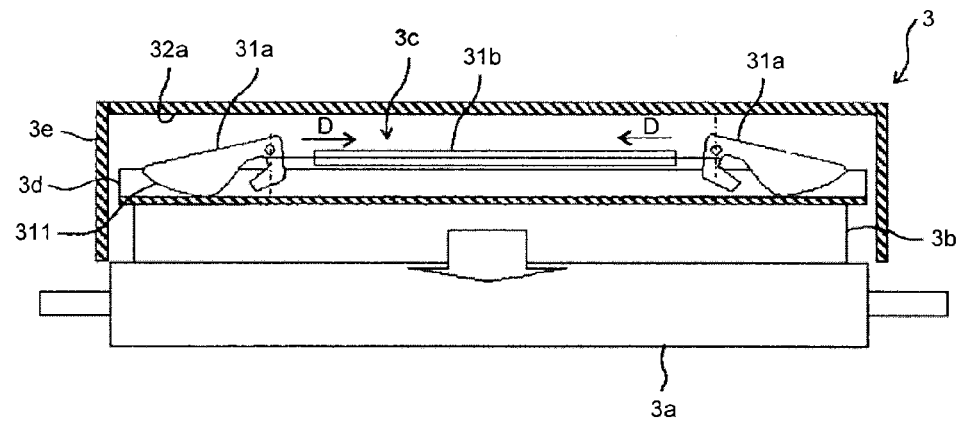
FIG. 3 is an explanatory view illustrating a schematic structure of a lubricant applying device.

The lubricant applying device 3 is described below in more detail. FIG. 3 is a schematic structural view of the lubricant applying device 3. As illustrated in FIG. 3, a lubricant holding member 3d is provided that holds along the longitudinal direction of the solid lubricant 3b a portion opposite the surface that the applying roller 3a (the surface on the lower side in FIG. 3) abuts of the solid lubricant 3b. The lubricant holding member 3d is provided in a housing case 3e such that the lubricant holding member 3d can approach to and leave from the applying roller 3a. In addition, the pushing mechanism 3c that pushes the lubricant holding member 3d to the supplying member side is provided in a space above the lubricant holding member 3d in the housing case 3e.

The pushing mechanism 3c has swing members 31a that are provided one each near both ends in the longitudinal direction of the lubricant holding member 3d and attached to the housing case 3e swingably, and a spring 31b serving as a biasing unit. Respective both ends of the spring 31b are attached to the swing members 31a. Each swing member 31a receives from the spring 31b a biasing force acting toward the center in the longitudinal direction of the lubricant holding member 3d as indicated with arrow D in FIG. 3. The biasing force urges the swing member 31a on the right side to swing counterclockwise in FIG. 2 and the swing member 31a on the left side to swing clockwise in FIG. 2. As a result, an arc-like abutting portion 311 abutting the lubricant holding member 3d of each swing member 31a is urged to push the lubricant holding member 3d as illustrated in FIG. 3.

At the beginning of use, a swing end of each swing member 31a swings so as to approach to an inner surface 32 of an upper surface portion of the housing case 3e against the biasing force of the spring 31b. In the structure thus described, the swing members 31a evenly push the lubricant holding member 3d by the biasing force of the spring 31b, thereby pushing the solid lubricant 3b held by the lubricant holding member 3d to the applying roller 3a. Accordingly, the solid lubricant 3b is evenly pushed to the applying roller 3a along the longitudinal direction of solid lubricant 3b. As a result, an amount of lubricant scraped by the rotation of the applying roller 3a making a sliding contact with and rubbing the lubricant is uniformed in the longitudinal direction of the solid lubricant 3b, thereby enabling the lubricant to be applied to the surface of the photosensitive element 1 without having uneven thicknesses.

Figure 4:
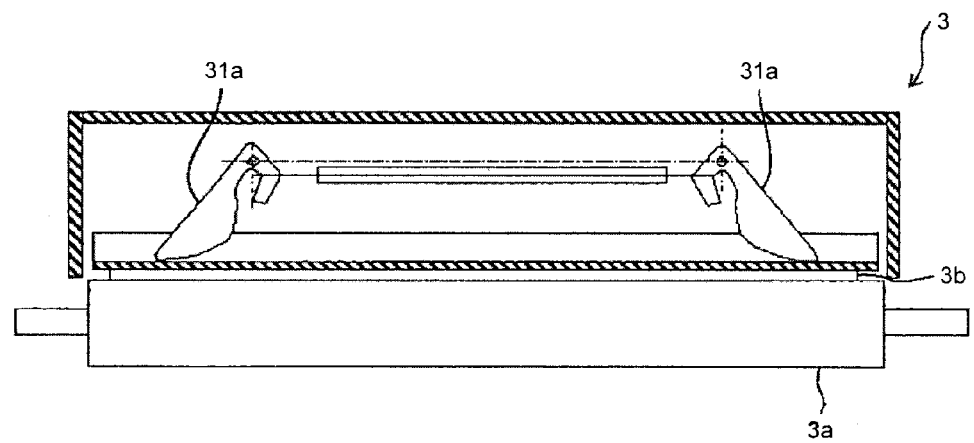
FIG. 4 is an explanatory view illustrating the schematic structure of the lubricant applying device at an end stage of use.

FIG. 4 is a schematic structural view of the lubricant applying device 3 at a near-end stage of use (an amount of the remaining lubricant is small). As the solid lubricant 3b is gradually scraped by the applying roller 3a making a sliding contact with and rubbing the solid lubricant 3b, the swing members 31a swing, causing the lubricant holding member 3d to move toward the applying roller 3a. Finally, when an amount of the solid lubricant 3b is small as illustrated in FIG. 4, the swing ends of the swing members 31a abut the lubricant holding member 3d.

The pushing mechanism 3c of the embodiment can prevent the pushing force of the solid lubricant 3b from being reduced when the height of the solid lubricant 3b is reduced in a long period of use. As a result, a fluctuation in amount of powdered lubricant supplied to the surface of the photosensitive element 1 can be controlled in a small range from the beginning to the end of use.

The reason why such a small fluctuation can be achieved is as follows. In general, the longer the whole length of the spring, the smaller the fluctuation in biasing force of the spring in relation to an amount of change in elongation of the spring from the beginning to the end of use of the solid lubricant 3b. In the conventional pushing mechanism, the springs are arranged in a compressed state and also in such a manner that the direction of the biasing force (pushing force) of the springs coincides with the pushing direction of the solid lubricant 3b to the applying roller 3a. In such a structure, the longer the whole lengths of the respective springs, the more difficult the direction of the biasing force of the springs and the pushing direction of the solid lubricant 3b to the applying roller 3a coincides with each other, thereby limiting the whole lengths of the respective springs to a certain range. In addition, the conventional pushing mechanism needs a space corresponding to the whole lengths of the respective springs in a radial direction of the applying roller 3a to arrange the springs, resulting in an increase in size of the apparatus. Because of the reasons described as above, the conventional pushing mechanism needs the springs having relatively short lengths to use, thereby increasing the fluctuation in biasing force of the springs as time elapses.

In contrast, in the pushing mechanism 3c of the embodiment, the spring 31b is disposed in an extended state as illustrated in FIG. 3 and the solid lubricant 3b can be pushed to the applying roller 3a using the biasing force (tension) of the spring 31b. Accordingly, the elongation of the whole length of the spring 31b does not cause such a problem of the conventional pushing mechanism. In addition, in the pushing mechanism 3c of the embodiment, the spring 31b is disposed in such a manner that the longitudinal direction of the spring 31b coincides with the longitudinal direction of the solid lubricant 3b. i.e., the axial direction of the applying roller 3a. Accordingly, the elongation of the whole length of the spring 31b needs no extra space to dispose the spring 31b in the radial direction of the applying roller 3a, thereby not requiring the apparatus to increase in size. Because of this reason, the pushing mechanism 3c of the embodiment can use the spring 31b having a much longer length than that of the spring used in the conventional pushing mechanism. As a result, the temporal fluctuation in biasing force of the spring can be reduced to a small range.

Figure 5:
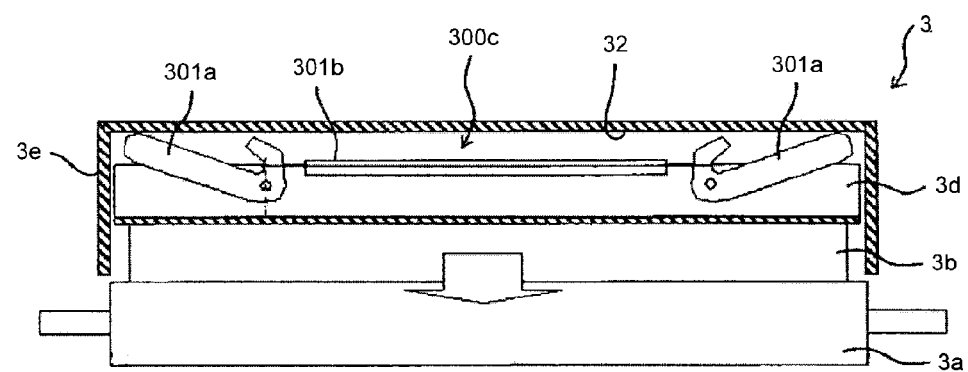
FIG. 5 is an explanatory view illustrating a schematic structure of the lubricant applying device including a modification of a pushing mechanism.

FIG. 5 is a schematic structural view of the lubricant applying device including a pushing mechanism of a modification. In a pushing mechanism 300c of the modification, swing members 301a are attached to the lubricant holding member 3d swingably. As a result, the swing end of each swing member 301a is urged to leave from the lubricant holding member 3d by a biasing force of a spring 301b acting toward the center in the longitudinal direction of the lubricant holding member 3d and the swing end of each swing member 301a abuts the inner surface 32 of the upper surface portion of the housing case 3e.

Figure 6:
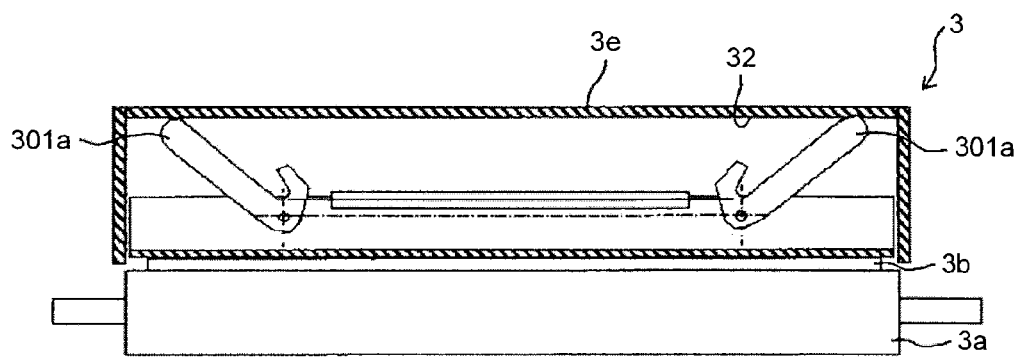
FIG. 6 is a schematic structural view illustrating a state of the lubricant applying device illustrated in FIG. 5 at an end stage of use.

At the beginning of use as illustrated in FIG. 5, the swing end of each swing member 301a swings so as to approach to the lubricant holding member 3d against the biasing force of the spring 301b. In this modification, the swing members 301a evenly push the inner surface 32 of the upper face portion of the housing case 3e by the biasing force of the spring 301b, thereby pushing the solid lubricant 3b held by the lubricant holding member 3d to the applying roller 3a. Also in the modification, as the solid lubricant 3b is gradually scraped by the applying roller 3a making a sliding contact with and rubbing the solid lubricant 3b, the swing members 301a swing, causing the lubricant holding member 3d to move toward the applying roller 3a. Finally, when an amount of the solid lubricant 3b is small, the swing members 301a swing in a state as illustrated in FIG. 6.

A remaining amount detecting mechanism 40 that serves as a remaining amount detecting unit detecting a near-end of the solid lubricant, which is an advantageous feature of the embodiment, is described below.

Figure 7:
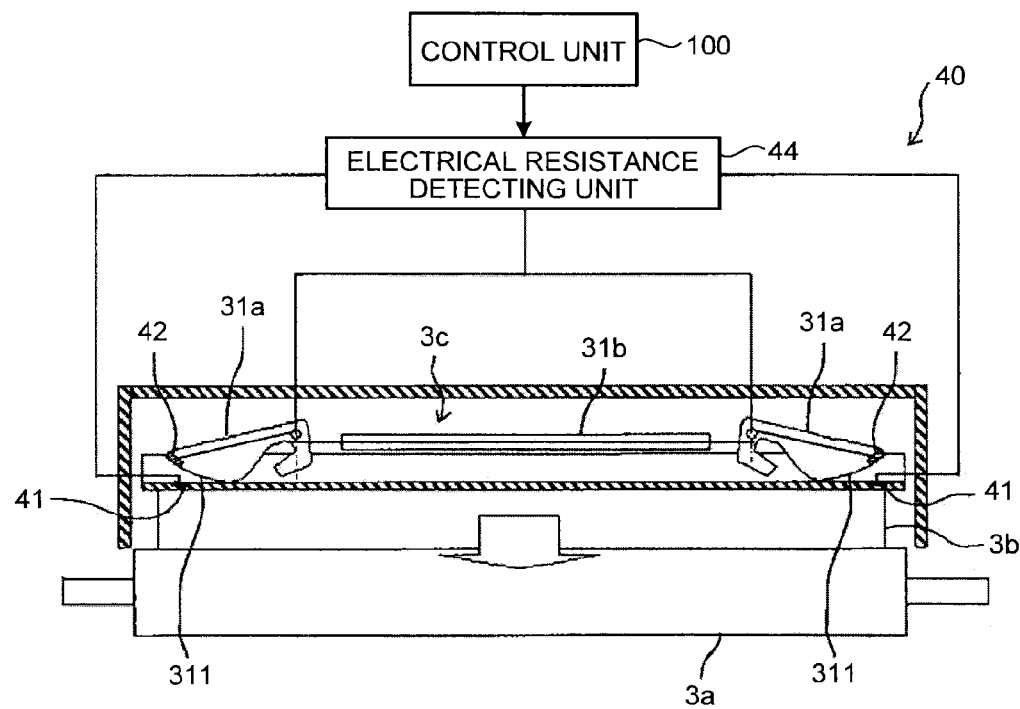
FIG. 7 is a schematic structural view of the lubricant applying device including a remaining amount detecting mechanism.
Figure 8:
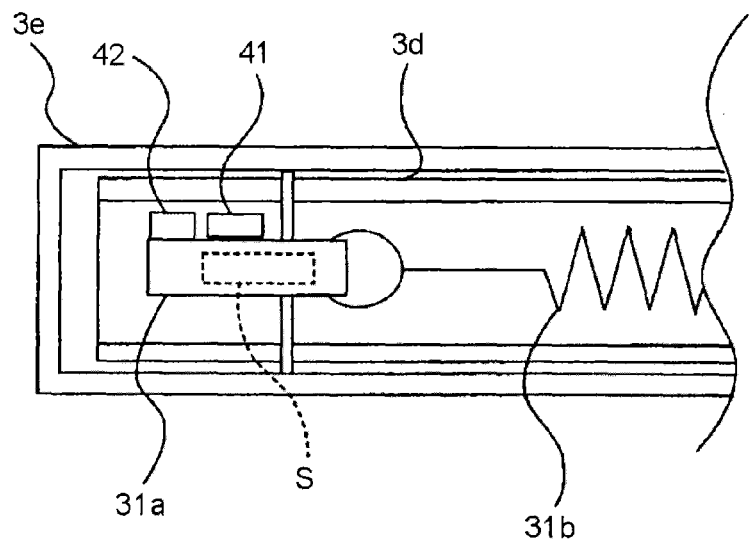
FIG. 8 is a plan view of the vicinity of a swing member on one side of the lubricant applying device of FIG. 7.

FIG. 7 is a schematic structural view illustrating a structure in which the remaining amount detecting mechanism 40 in the embodiment is included in the lubricant applying device 3 including the pushing mechanism 3c illustrated in FIGS. 3 and 4. FIG. 8 is a plan view illustrating the vicinity of the swing member 31a on one side of the lubricant applying device 3 of FIG. 7.

As illustrated in FIG. 7, the remaining amount detecting mechanism 40 includes first electrode members 41 and second electrode members 42. The first electrode members 41 are provided one each near both ends in the longitudinal direction of a surface, which faces the swing members 31a, of the lubricant holding member 3d. As illustrated in FIG. 8, each of the first electrode members 41 is disposed so as to shift from the sliding area S, on which the swing member 31a slides, of the lubricant holding member 3d in the short side direction (downward in FIG. 8) of the lubricant holding member 3d. Each of the first electrode members 41 has such a predetermined length in the longitudinal direction that the first electrode member 41 and the corresponding second electrode member 42 are reliably abutted at the near-end of the solid lubricant 3b even if the position of the lubricant holding member 3d shifts in the longitudinal direction.

As illustrated in FIG. 8, each of the second electrode members 42 is provided on the side surface (surface on the lower side in FIG. 8) of the corresponding swing member 31a. As illustrated in FIG. 7, each of the second electrode members 42 is disposed near the swing end of the corresponding swing member 31a.

An electrical resistance detecting unit 44 serving as a voltage applying unit connects to the first electrode member 41 and the second electrode members 42. The electrical resistance detecting unit 44 connects to a control unit 100 that controls the electrical resistance detecting unit 44. The electrical resistance detecting unit 44 applies a voltage between the first electrode member 41 and the second electrode members 42 and measures an electrical resistance.

At the beginning of use as illustrated in FIG. 7, the second electrode members 42 attached to the respective swing members 31a are away from the first electrode members 41 provided on the lubricant holding member 3d, i.e., a non-conduction state is established between the respective first electrode members and the respective second electrode members. Even if the electrical resistance detecting unit 44 applies a voltage between the first electrode members 41 and the second electrode members 42, no current flows between the first electrode members 41 and the second electrode members 42. As a result, no electrical resistance value can be measured.

Figure 9:
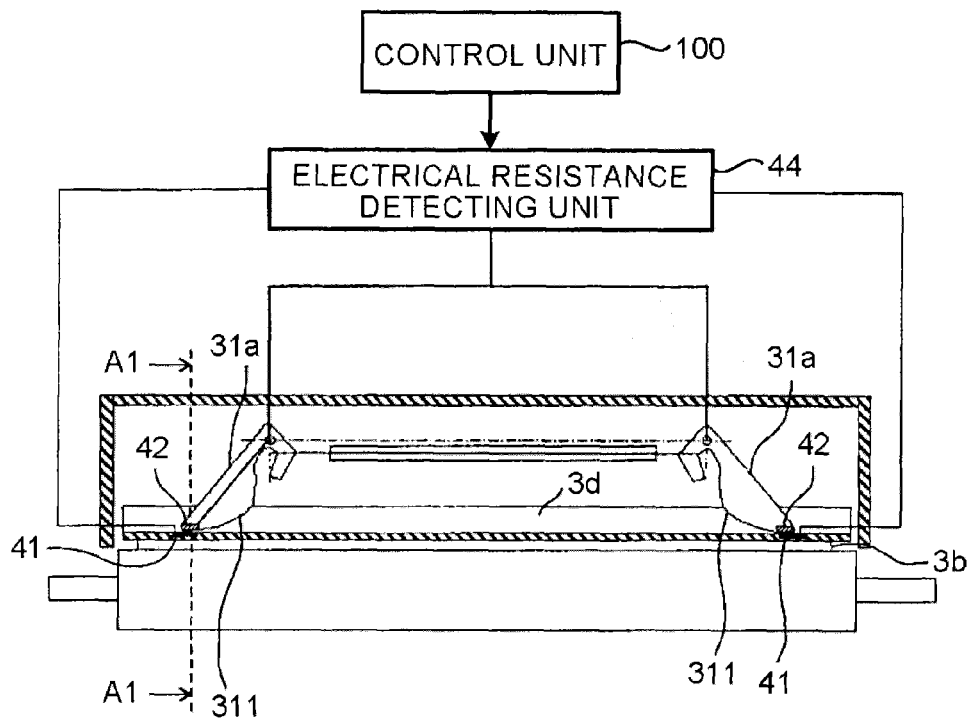
FIG. 9 is an explanatory view illustrating a state at a near-end of solid lubricant.
Figure 10:
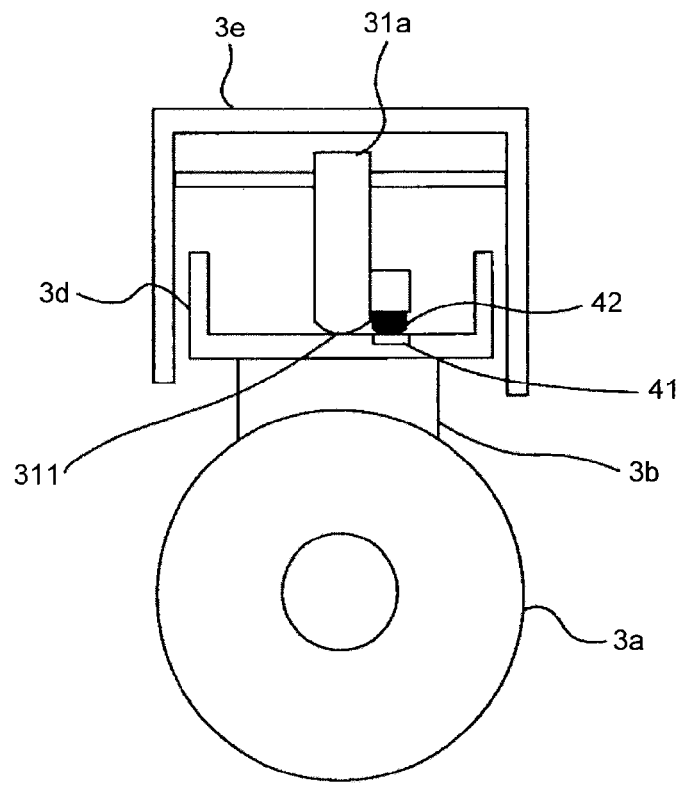
FIG. 10 is a sectional view along line A1-A1 of FIG. 9.

FIG. 9 is a schematic diagram illustrating a near-end state of the solid lubricant 3b. FIG. 10 is a sectional view along line A1-A1 of FIG. 9.

As the solid lubricant 3b is scraped and consumed, the swing members 31a swing while sliding on the surface of the lubricant holding member 3d, resulting in the second electrode members 42 gradually approaching the first electrode members 41. When the remaining amount of the solid lubricant 3b is small (the near-end) as illustrated in FIGS. 9 and 10, the second electrode members 42 abut the first electrode members 41. Once the second electrode members 42 abut the first electrode members 41, the non-conduction state between the first electrode members 41 and the second electrode members 42 turns to a conduction state. When the electrical resistance detecting unit 44 applies a voltage between the first electrode members 41 and the second electrode members 42, a current flows between the first electrode members 41 and the second electrode members 42, and thus the electrical resistance detecting unit 44 measures an electrical resistance value.

The control unit 100, which watches the measurement results of the electrical resistance detecting unit 44, determines the near-end of the lubricant when detecting that the electrical resistance value detected by the electrical resistance detecting unit 44 is equal to or smaller than a certain value. Then, the control unit 100 notifies an operation display unit (not illustrated) of that the remaining amount of the lubricant is small so as to promote a user to replace the lubricant with new lubricant. The control unit 100 may notify a service center of the necessity of replacement of the lubricant, using a communications unit (not limited).

The lubricant holding member 3d is provided in the housing case 3e so as to be movable in a direction along which the lubricant holding member 3d approaches to and distances from the applying roller 3a (in the direction perpendicular to FIG. 8). Accordingly, the lubricant holding member 3d is held in the housing case 3e with a certain amount of backlash therebetween in the longitudinal direction. As a result, the position of the lubricant holding member 3d shifts in the longitudinal direction during use in some cases.

If the first electrode member 41 is disposed on the left end of the sliding area S in FIG. 8 and the second electrode member 42 is disposed near the swing end of the abutting portion of the swing member 31a, and the first electrode member 41 and the second electrode member 42 are abutted at the near-end of the solid lubricant 3b, the abutting portion of any one of the swing members 31a abuts the first electrode member 41 at a different position from the second electrode member 42 in some cases when the position of the lubricant holding member 3d shifts in the longitudinal direction. In this case, a material that the swing member 31a abuts is changed to another material halfway, resulting in a sliding state being changed due to a difference in friction coefficient between the materials. This causes the sliding condition to differ between one swing member abutting the first electrode member 41 at the abutting portion and the other swing member that does not abut the first electrode member 41 at the abutting portion. As a result, a pushing force of the solid lubricant 3b against the applying roller 3a differs between one side and the other side in the longitudinal direction, thereby causing an amount of applied lubricant to differ in the axial direction of the photosensitive element in some cases.

In contrast, in the embodiment, the first electrode member 41 is disposed at the different position from the sliding area S, on which the swing member 31a slides, of the lubricant holding member 3d, as illustrated in FIG. 8. Because of this structure, the abutting portions 311 of the swing members 31a do not slide on the first electrode members 41 even if the position of the lubricant holding member 3d shifts in the longitudinal direction during use. As a result, the respective swing members 31a swing in the same manner, thereby enabling a pushing force of the solid lubricant 3b against the applying roller 3a to be uniform in the longitudinal direction. Consequently, the lubricant can be applied uniformly to the photosensitive element in the axial direction.

In the embodiment, the non-conduction state is established between the first electrode members 41 and the second electrode members 42 before the near-end of the lubricant, and thus no current flows even if a voltage is applied between the electrode members. As a result, no power is consumed at every detection of the near-end, thereby enabling power consumption to be reduced.

In the embodiment, the conduction states between the first electrode members 41 and the second electrode members 42 are detected near both ends in the longitudinal direction of the lubricant holding member 3d. Accordingly, even if the consumption of the lubricant differs in the longitudinal direction of the solid lubricant 3b, the second electrode member 42 near the end on a side in which the lubricant is much more consumed than the other side abuts the first electrode member 41 at the near-end of the much more consumed end, thereby establishing the conduction therebetween. This structure makes it possible to accurately detect the near-end of the lubricant even if the consumption amount of the lubricant differs in the longitudinal direction of the solid lubricant 3b. As a result, occurrence of failures can be prevented, such as scratches on the surface of the photosensitive element occurring when no lubricant protection is provided on the surface of the photosensitive element on the side in which the lubricant is exhausted due to a large amount of consumption.

Figure 11:
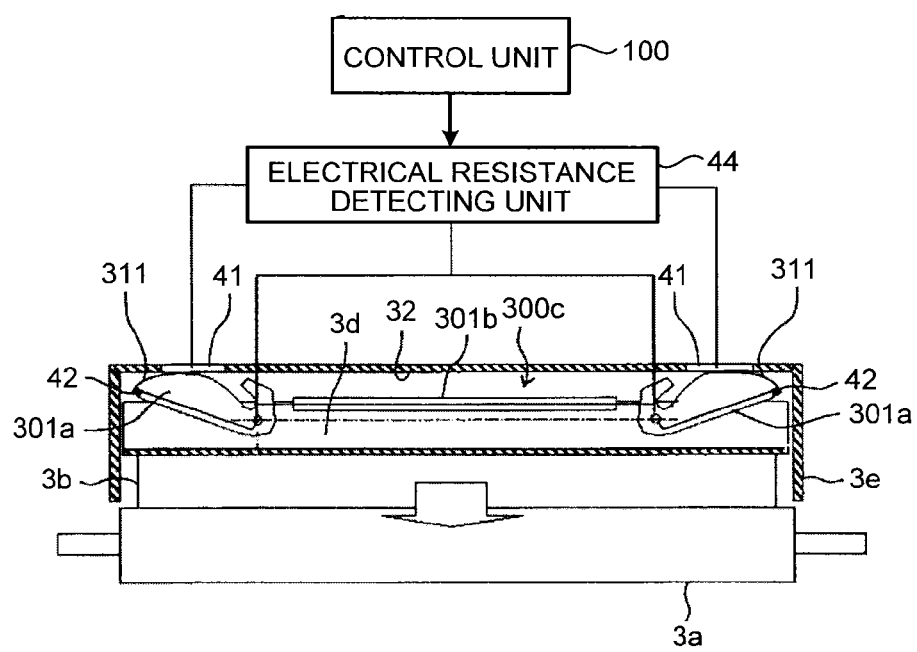
FIG. 11 is an explanatory view illustrating a schematic structure of the lubricant applying device including the remaining amount detecting mechanism in addition to the modification of the pushing mechanism.
Figure 12:
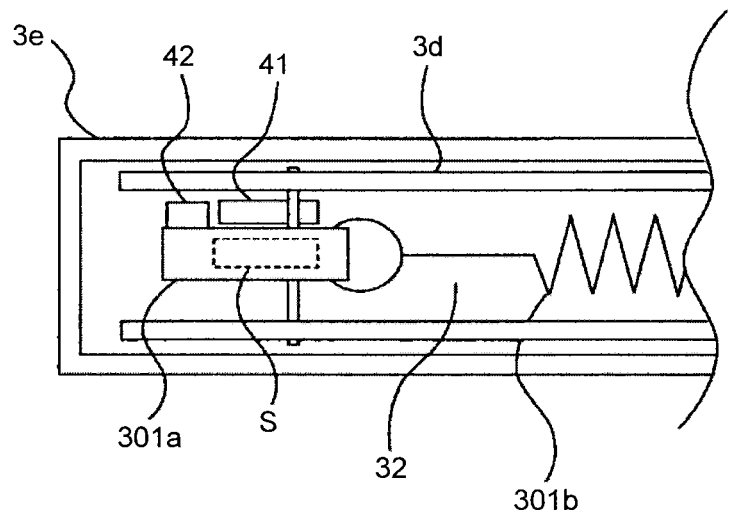
FIG. 12 is a plan view of the vicinity of the swing member on one side of the lubricant applying device of FIG. 11.

FIG. 11 is a schematic structural view illustrating a structure in which the remaining amount detecting mechanism 40 in the embodiment is included in the lubricant applying device 3 including the pushing mechanism 300c illustrated in FIGS. 5 and 6. FIG. 12 is a bottom view illustrating the vicinity of the swing member 31a on one side of the lubricant applying device 3 of FIG. 11.

In the pushing mechanism 300c in the modification, the abutting portions 311 of the respective swing members 31a slide on the inner surface 32 of the upper surface portion of the housing case 3e. Thus, the first electrode members 41 are provided near both ends in the longitudinal direction of the inner surface 32. As illustrated in FIG. 12, each of the first electrode members 41 is disposed so as to shift from the sliding area S, on which the swing member 301a slides, of the inner surface 32 of the upper surface portion, in the short side direction (upward in FIG. 12) of the lubricant holding member 3d. Each of the first electrode members 41 has such a predetermined length in the longitudinal direction that the first electrode member 41 and the corresponding second electrode member 42 are reliably abutted at the near-end of the solid lubricant 3b even if the position of the lubricant holding member 3d shifts in the longitudinal direction.

As illustrated in FIG. 12, each of the second electrode members 42 is provided on the side surface (surface on the upper side in FIG. 12) of the corresponding swing member 301a. As illustrated in FIG. 11, each of the second electrode members 42 is disposed near the swing end of the corresponding swing member 301a.

Figure 13:
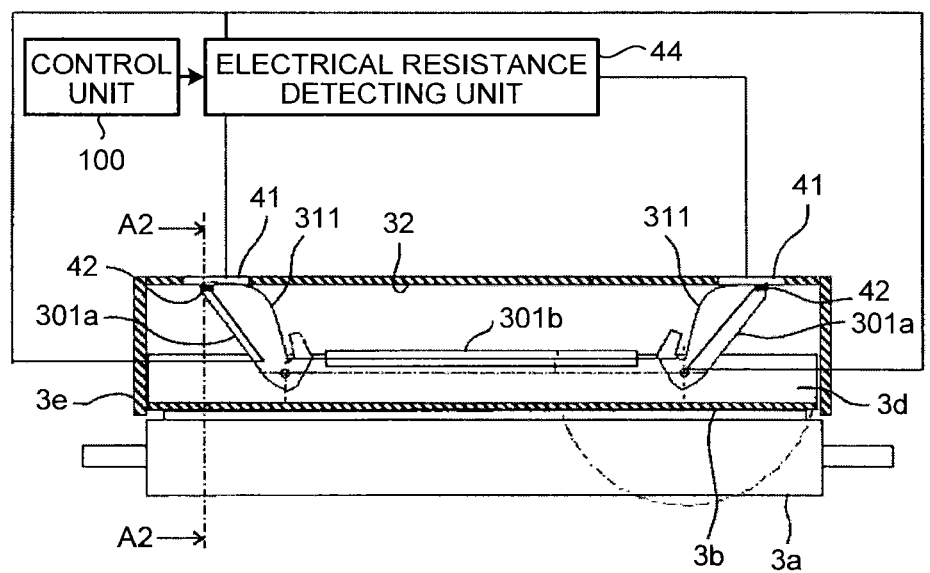
FIG. 13 is an explanatory view illustrating a state of the structure illustrated in FIG. 11 at the near-end of the lubricant.
Figure 14:
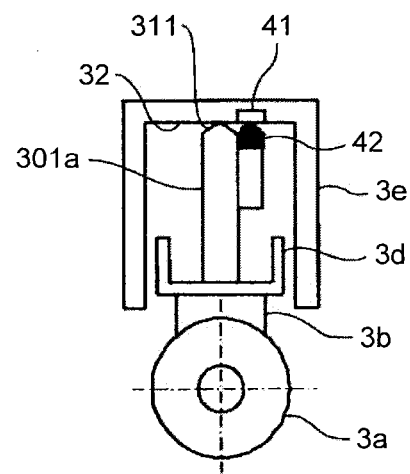
FIG. 14 is a sectional view along line A2-A2 of FIG. 13.

FIG. 13 is a schematic diagram illustrating a state of the structure illustrated in FIG. 11 at the near-end of the solid lubricant 3b. FIG. 14 is a sectional view along line A2-A2 of FIG. 13.

At the beginning of use in the structure illustrated in FIG. 11, the second electrode members 42 attached to the respective swing members 31a are away from the first electrode members 41 provided on the lubricant holding member 3d. As the solid lubricant 3b is scraped and consumed, the swing members 301a swing while sliding on the inner surface 32 of the upper surface portion of the housing case 3e, resulting in the second electrode members 42 gradually approaching the first electrode members 41. When the remaining amount of the solid lubricant 3b is small (the near-end) as illustrated in FIGS. 13 and 14, the second electrode members 42 abut the first electrode members 41. Once the second electrode members 42 abut the first electrode members 41, the non-conduction state between the first electrode members 41 and the second electrode members 42 turns to the conduction state. When the electrical resistance detecting unit 44 applies a voltage between the first electrode members 41 and the second electrode members 42, a current flows between the first electrode members 41 and the second electrode members 42, and thus the electrical resistance detecting unit 44 measures an electrical resistance value.

In the structure illustrated in FIG. 11, the first electrode members 41 are arranged at the respective positions different from the respective sliding areas S, on which the respective swing members 301a slide, of the inner surface 32 of the upper surface portion of the housing case 3e. Because of this structure, the abutting portions 311 of the swing members 301a do not slide on the first electrode members 41 even if the position of the lubricant holding member 3d shifts in the longitudinal direction during use and the positions of the swing members 301a held by the lubricant holding member 3d shift in the longitudinal direction. As a result, the respective swing members 301a swing in the same manner, thereby enabling a pushing force of the solid lubricant 3b against the applying roller 3a to be uniform in the longitudinal direction. Consequently, the lubricant can be applied uniformly to the photosensitive element 1 in the axial direction.

In the structure illustrated in FIG. 11, the non-conduction state is established between the first electrode members 41 and the second electrode members 42 before the near-end of the lubricant, and thus no current flows even if a voltage is applied between the electrode members. As a result, no power is consumed at every detection of the near-end, thereby enabling power consumption to be reduced.

Figure 15:
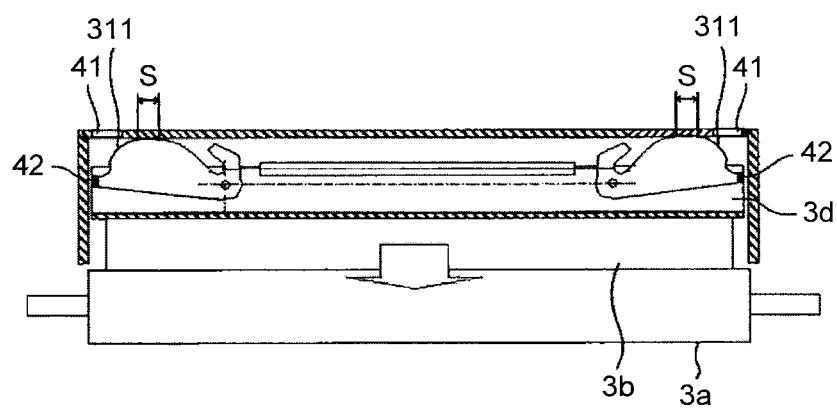
FIG. 15 is an explanatory view illustrating a modification of the remaining amount detecting mechanism.
Figure 16:
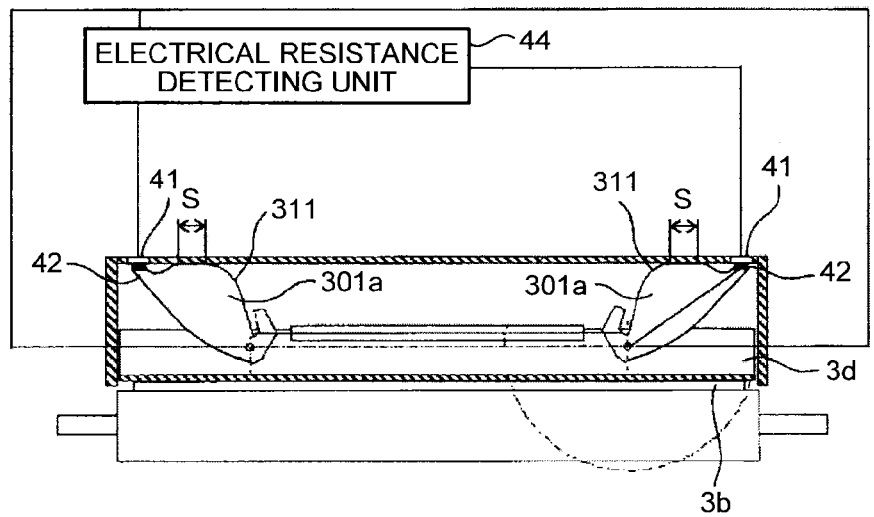
FIG. 16 is an explanatory view illustrating a state of the structure illustrated in FIG. 15 at the near-end of the lubricant.

FIGS. 15 and 16 are schematic diagrams illustrating a modification of the remaining amount detecting mechanism 400. FIG. 15 illustrates a state at the beginning of use. FIG. 16 illustrates a near-end state of the lubricant.

In a first modification illustrated in FIGS. 15 and 16, the first electrode members are arranged so as to shift from the sliding areas S of the swing members in the longitudinal direction. Each of the distances between the sliding areas S and the first electrode members 41 is set to an amount equal to or larger than an amount of the backlash in the longitudinal direction between the lubricant holding member 3d and the housing case 3e. In such a structure, the abutting portions 311 of the swing members 301a do not slide on the first electrode members 41 even if the position of the lubricant holding member 3d shifts in the longitudinal direction during use. As a result, the respective swing members 301a swing in the same manner, thereby enabling a pushing force of the solid lubricant 3b against the applying roller 3a to be uniform in the longitudinal direction. Consequently, the lubricant can be applied uniformly to the photosensitive element 1 in the axial direction.

The detection manner of the near-end of the solid lubricant 3b performed by the remaining amount detecting mechanism 40 is not limited to the manner described above. For example, a structure may be employed in which the first electrode members 41 are replaced with push switches and the second electrode members 42 are replaced with pushing members. In this case, as the swing members swing, the pushing members attached to the respective swing members approach the corresponding push switches. At the near-end of the solid lubricant, the pushing members push the corresponding push switches. As a result, the near-end is detected. In the structure, the push switches are provided at respective positions different from the respective sliding areas S, thereby enabling the near-end of the solid lubricant to be accurately detected because the swing members do not push the push switches before the near-end even if the position of the lubricant holding member shifts in the longitudinal direction.

Furthermore, a structure is adoptable in which the near-end of the solid lubricant is detected by photo sensors. In this case, transmissive windows are provided at respective arrangement positions of the first electrode members and photo sensors are arranged so as to face the respective transmissive windows. Reflective plates are disposed at the respective arrangement positions of the second electrode members. In the structure, at the near-end of the solid lubricant, the reflective plates attached to the swing members face the corresponding transmissive windows and the photo sensors detect reflected light. As a result, the near-end of the lubricant is detected. Also, the structure can prevent the swing members from sliding on the transmissive windows even if the position of the lubricant holding member shifts in the longitudinal direction by arranging the transmissive windows at the respective positions different from the sliding areas S. As a result, a pushing force of the solid lubricant 3b against the applying roller 3a can be made uniform in the longitudinal direction. Furthermore, the near-end of the lubricant can be detected using transmissive photo sensors (photo interrupters) instead of reflective photo sensors (photo reflectors).

The lubricant applying device described above may be applied to a lubricant applying device that applies lubricant to the intermediate transfer belt 56.

The above descriptions are represented by way of example. The first embodiment has particular effects in the following aspects (1) to (9):

Aspect (1)

According to aspect (1) of the first embodiment, a lubricant supplying device is, for example, the lubricant applying device 3 that includes the solid lubricant 3b, a supplying member such as the applying roller 3a that abuts the solid lubricant 3b, scrapes the lubricant by making a sliding contact with and rubbing the solid lubricant 3b, and supplies the scraped lubricant to a lubricant supply target such as the photosensitive element 1, the lubricant holding member 3d that holds the solid lubricant 3b, the housing case 3e that houses the lubricant holding member 3d such that the solid lubricant 3b can move toward the supplying member, the pushing mechanism 3c that includes a pair of swing members 31a swingably supported in the housing case and a biasing unit such as the spring 31b urging the swing members 31a to swing in such a direction that the swing members 31a push the lubricant holding member 3d toward the supplying member, and in which the swing members 31a swing while sliding on the inner surface of the housing case 3e or the lubricant holding member 3d to push the lubricant holding member 3d toward the supplying member, and a remaining amount detecting unit such as the remaining amount detecting mechanism 40 that detects that a remaining amount of the solid lubricant is equal to or smaller than a predetermined amount. In the lubricant supplying device, the remaining amount detecting unit includes first detection members such as the first electrode members 41 provided on the member on which the swing members 31a slide when swinging, and second detection members such as the second electrode members 42 provided on the respective swing members 31a such that the second electrode members 42 abut or face the respective first detection members when the swing postures of the respective swing members 31a reach the respective swing postures corresponding to that the remaining amount of the solid lubricant 3b is the predetermined amount, and the first detection members are provided at the respective positions different from the respective sliding areas S, on which the respective swing members 31a slide, of the member on which the swing members 31a slide when swinging.

In the lubricant supplying device thus structured, the solid lubricant 3b can be pushed to the supplying member more uniformly in the longitudinal direction of the solid lubricant 3b than a case when the first detection members are provided in the sliding areas S, as described in the embodiment. As a result, the lubricant can be uniformly supplied to the lubricant supply target such as the photosensitive element 1. In addition, when the remaining amount of the lubricant is small, the first detection members 41 and the second detection members are abutted, thereby establishing the conduction therebetween. As a result, power consumption can be more reduced than the device in which the detection is performed while the conduction is established from the beginning of use.

Aspect (2)

In the lubricant supplying device described in aspect (1), the first detection members are arranged at the positions shifted from the respective sliding areas S on which the respective swing members 31a slide, in a direction perpendicular to both of the longitudinal direction of the solid lubricant 3b and the moving direction of the lubricant holding member.

The lubricant supplying device thus structured can prevent the abutting portions 311 of the swing members 31a from abutting the first detection members when the position of the lubricant holding member 3d shifts in the longitudinal direction.

Aspect (3)

In the lubricant supplying device described in aspect (1) or (2), the first detection members and the second detection members are electrode members and are abutted when the swing postures of the respective swing members 31a reach the respective swing postures corresponding to that the remaining amount of the solid lubricant is the predetermined amount, and the remaining amount detecting unit detects the remaining amount of the solid lubricant 3b by applying a voltage between the respective first detection members and the respective second detection members and detecting a conduction state between the electrodes.

In the lubricant supplying device thus structured, when the remaining amount of the lubricant is small, the first detection members 41 and the second detection members 42 are abutted and the conduction is established therebetween. As a result, power consumption can be more reduced than the device in which the detection is performed while the conduction is established from the beginning of use.

Aspect (4)

In the lubricant supplying device described in any of aspects (1) to (3), the solid lubricant 3b contains a fatty acid metal salt.

The lubricant supplying device thus structured can form a protective lubricant film layer that is hardly affected by environmental changes and has a high capability of protecting the surface of the photosensitive element, thereby enabling the surface of the photosensitive element to be protected well, as described in the embodiment. In addition, the lubricant supplying device can maintain the surface of the photosensitive element in a low frictional state, thereby enabling the occurrence of cleaning failures to be prevented.

Aspect (5)

In the lubricant supplying device described in aspect (4), the fatty acid metal salt is zinc stearate. As a result, the same effect as aspect (4) can be obtained well.

Aspect (6)

In the lubricant supplying device described in any of aspects (1) to (5), the solid lubricant contains inorganic lubricant.

The lubricant supplying device thus structured can protect the surface of the photosensitive element well as described in the embodiment. As a result, the lubricant supplying device can prevent the occurrence of failures due to the sticking of lubricant to the roller charging device 2a and noises of the cleaning blade 8a due to the vibration thereof.

Aspect (7)

In the lubricant supplying device described in aspect (6), the inorganic lubricant is boron nitride.

The lubricant supplying device thus structured can obtain the same effect as aspect (6) well.

Aspect (8)

In an image forming apparatus that includes an image carrier such as the photosensitive element 1 and a lubricant supplying unit supplying lubricant to a surface of the image carrier, and forms an image on a recording material by transferring an image on the image carrier to the recording material, the lubricant supplying device described in any of aspects (1) to (7) is used as the lubricant supplying unit.

The image forming apparatus thus structured can detect a near-end of the lubricant well and prevent image forming operation from being performed without supply of the lubricant. As a result, the temporal deterioration of the photosensitive element can be prevented.

Aspect (9)

In a process cartridge that includes an image carrier such as the photosensitive element 1 and a lubricant supplying unit supplying lubricant to a surface of the image carrier, and is attachable to and detachable from an image forming apparatus, the lubricant supplying device described in any of aspects (1) to (7) is used as the lubricant supplying unit.

The process cartridge thus structured can detect a near-end of the lubricant well and prevent image forming operation from being performed without supply of the lubricant. As a result, the process cartridge can be provided that can prevent the temporal deterioration of the photosensitive element.

Second Embodiment

The remaining amount detecting mechanism 40 is described below that serves as the remaining amount detecting unit detecting the near-end of the solid lubricant, and is an advantageous feature of a second embodiment of the invention differing from the lubricant supplying device of the first embodiment. The second embodiment includes the same structures as those described with reference to FIGS. 1 to 6. The duplicated descriptions thereof are omitted.

Figure 17:
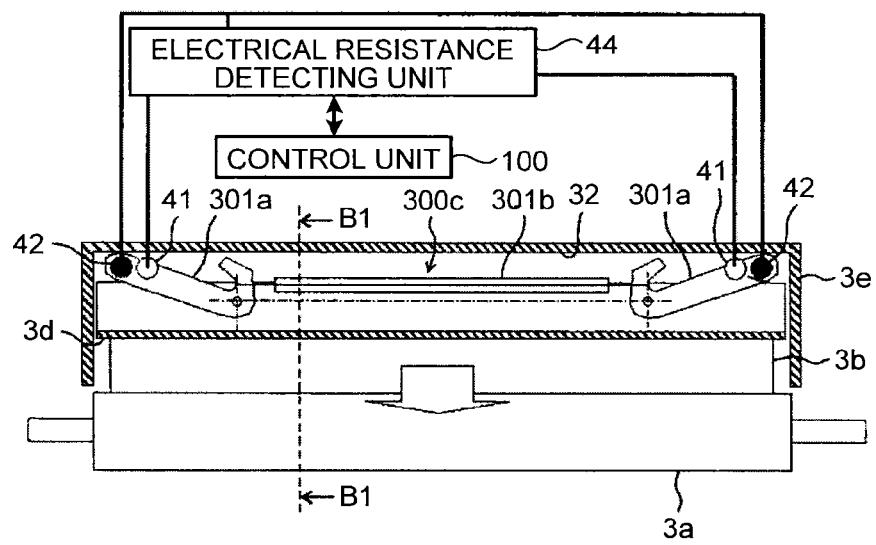
FIG. 17 is a schematic structural view of the lubricant applying device including the remaining amount detecting mechanism according to a second embodiment of the invention.
Figure 18:
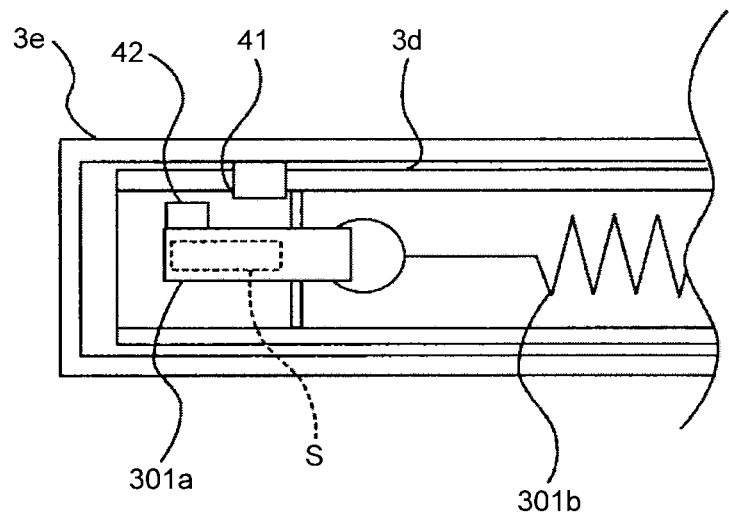
FIG. 18 is a bottom view of the vicinity of the swing member on one side of the lubricant applying device of FIG. 17.
Figure 19:
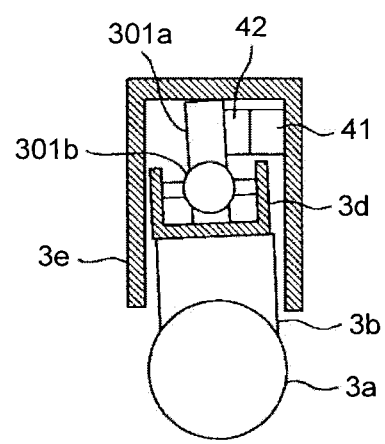
FIG. 19 is a sectional view along line B1-B1 of FIG. 17.

FIG. 17 is a schematic structural view illustrating a structure in which the remaining amount detecting mechanism 40 in the second embodiment is included in the lubricant applying device 3 including the pushing mechanism 300c illustrated in FIGS. 5 and 6. FIG. 18 is a bottom view illustrating the vicinity of the swing member 301a on one side of the lubricant applying device 3 of FIG. 17. FIG. 19 is a sectional view along line B1-B1 of FIG. 17.

As illustrated in FIG. 17, the remaining amount detecting mechanism 40 includes the first electrode members 41 serving as the first detection members and the second electrode members 42 serving as the second detection members. The first electrode members 41 are provided one each near both ends in the longitudinal direction of a side surface of the housing case 3e. As illustrated in FIGS. 18 and 19, each of the second electrode members 42 is provided on the side surface of the corresponding swing member 31a. As illustrated in FIG. 17, each of the second electrode members 42 is disposed near the swing end of the corresponding swing member 31a. At the beginning of use of the solid lubricant 3b as illustrated in FIG. 17, the first electrode members 41 are positioned closer to the central area in the longitudinal direction than the second electrode members 42.

The electrical resistance detecting unit 44 serving as a voltage applying unit connects to the first electrode members 41 and the second electrode members 42. The electrical resistance detecting unit 44 connects to the control unit 100 that controls the electrical resistance detecting unit 44. The electrical resistance detecting unit 44 applies a voltage between the first electrode members 41 and the second electrode members 42 and measures an electrical resistance.

At the beginning of use as illustrated in FIGS. 17 and 19, the second electrode members 42 attached to the respective swing members 301a are away from the first electrode members 41, i.e., the non-conduction state is established between the electrode members 41 and 42. Even if the electrical resistance detecting unit 44 applies a voltage between the first electrode members 41 and the second electrode members 42, no current flows between the first electrode members 41 and the second electrode members 42. As a result, no electrical resistance value can be measured.

Figure 20:
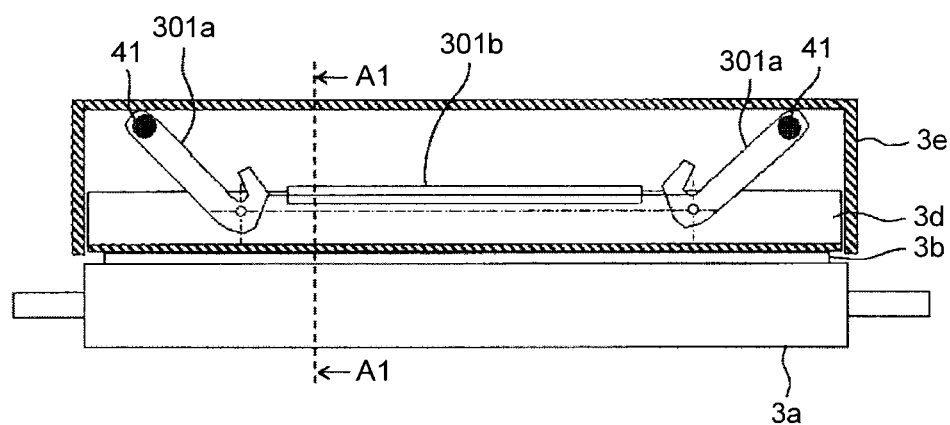
FIG. 20 is an explanatory view illustrating a near-end state of the solid lubricant.
Figure 21:
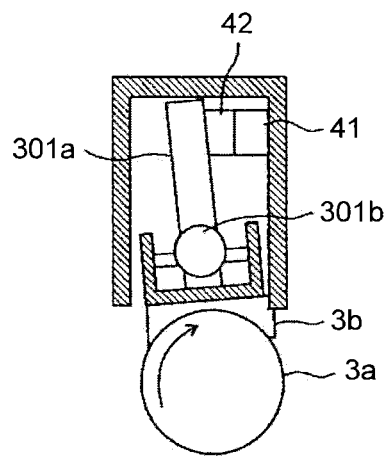
FIG. 21 is a sectional view along line A1-A1 of FIG. 20.

FIG. 20 is a schematic diagram illustrating a near-end state of the solid lubricant 3b. FIG. 21 is a sectional view along line A1-A1 of FIG. 20.

As the solid lubricant 3b is scraped and consumed, the swing members 301a swing while sliding on the inner surface 32 of the upper surface portion of the housing case 3e, resulting in the second electrode members 42 gradually approaching the first electrode members 41. When the remaining amount of the solid lubricant 3b is small (the near-end) as illustrated in FIGS. 20 and 21, the second electrode members 42 abut the first electrode members 41. Once the second electrode members 42 abut the first electrode members 41, the non-conduction state between the first electrode members 41 and the second electrode members 42 turns to the conduction state. When the electrical resistance detecting unit 44 applies a voltage between the first electrode members 41 and the second electrode members 42, a current flows between the first electrode members 41 and the second electrode members 42, and thus the electrical resistance detecting unit 44 measures an electrical resistance value.

The control unit 100, which monitors the measurement result of the electrical resistance detecting unit 44, determines the near-end of the solid lubricant 3b when detecting that the electrical resistance value detected by the electrical resistance detecting unit 44 is equal to or smaller than a certain value. Then, the control unit 100 notifies an operation display unit (not illustrated) that the remaining amount of the lubricant is small so as to prompt a user to replace the solid lubricant 3b with new lubricant. The control unit 100 may notify a service center of the necessity of replacement of the lubricant, using a communications unit (not illustrated).

The lubricant holding member 3d is housed in the housing case 3e so as to be movable in a direction along which the lubricant holding member 3d approaches and distances the applying roller 3a (in the direction perpendicular to FIG. 18). Accordingly, the lubricant holding member 3d is held in the housing case 3e with a certain amount of backlash therebetween in the longitudinal direction. The backlash (gap) occurs up to approximately 1 mm due to the accuracy in fixing the solid lubricant 3b to the lubricant holding member 3d, and fluctuations in accuracy of parts of the housing case 3e. As a result, the position of the lubricant holding member 3d shifts in the longitudinal direction during use in some cases.

If the first electrode member 41 is disposed on the left end of the sliding area S in FIG. 18 and the second electrode member 42 is disposed near the swing end of the abutting portion of the swing member 31a, and the first electrode member 41 and the second electrode member 42 are abutted at the near-end of the solid lubricant 3b, the abutting portion 311 of any one of the swing members 301a abuts the first electrode member 41 at a different position from the second electrode member 42 in some cases when the position of the lubricant holding member 3d shifts in the longitudinal direction. In this case, a material that the swing member 301a abuts is changed to another material halfway, resulting in a sliding state being changed due to a difference in friction coefficient between the materials. This causes the sliding condition to differ between one swing member 301a abutting the first electrode member 41 at the abutting portion 311 and the other swing member 301a that does not abut the first electrode member 41 at the abutting portion 311. As a result, a pushing force of the solid lubricant 3b against the applying roller 3a differs between one side and the other side in the longitudinal direction, thereby causing an amount of applied lubricant to differ in the axial direction of the photosensitive element 1 in some cases.

In contrast, in the embodiment, the first electrode member 41 is provided on the side surface of the housing case 3e as illustrated in FIG. 18. Because of this structure, the abutting portions 311 of the swing members 301a do not slide on the first electrode members 41 even if the position of the lubricant holding member 3d shifts in the longitudinal direction during use. As a result, the respective swing members 31a swing in the same manner, thereby enabling a pushing force of the solid lubricant 3b against the applying roller 3a to be uniform in the longitudinal direction. Consequently, the lubricant can be applied uniformly to the photosensitive element 1 in the axial direction.

In addition, the lubricant holding member 3d and the housing case 3e has backlash therebetween in a short side direction of the solid lubricant 3b (in a direction along which the applying roller 3a makes a sliding contact with and rubs the solid lubricant 3b, hereinafter this direction is also referred to as the direction in which the applying roller 3a rubs the solid lubricant 3b). The positions of the swing members 301a may shift in the short side direction together with the lubricant holding member 3d. The swing members 301a, however, are provided at the central area in the short side direction of the lubricant holding member 3d as illustrated in FIG. 18. The lubricant holding member 3d abuts the side surface of the housing case 3e before the swing members 301a abut the side surface of the housing case 3e. As a result, the swing members 301a do not abut the first electrode members 41 provided on the side surface of the housing case 3e. Consequently, the swing members 301a do not abut the first electrode members 41 even if the positions of swing members 301a shift in the short side direction together with the lubricant holding member 3d.

In the abutting area, in which the solid lubricant 3b abuts the applying roller 3a, of the solid lubricant 3b, the solid lubricant 3b receives a force toward downstream in the direction in which the lubricant is rubbed (downstream in the surface moving direction of the applying roller 3a) caused by the applying roller 3a making a sliding contact with and rubbing the solid lubricant 3b. As illustrated in FIG. 19, the gravity center of the integrated body of the solid lubricant 3b and the lubricant holding member 3d is positioned away from the abutting area, thereby causing the integrated body of the solid lubricant 3b and the lubricant holding member 3d to rotate counter clockwise in the housing case 3e. The force causing the integrated body to rotate acts on the abutting area of the solid lubricant 3b located upstream in the surface moving direction of the applying roller 3a because gaps are provided between the housing case 3e and the lubricant holding member 3d and between the housing case 3e and the solid lubricant 3b. As a result, the abutting area of the solid lubricant 3b located upstream in the surface moving direction of the applying roller 3a is further scraped than the abutting area of the solid lubricant 3b located downstream in the surface moving direction of the applying roller 3a, whereby the integrated body of the solid lubricant 3b and the lubricant holding member 3d rotates counter clockwise in FIG. 19 in the housing case 3e. As a result, the downstream end of the solid lubricant 3b in the surface moving direction of the applying roller 3a abuts the side surface of the housing case 3e located downstream in the surface moving direction of the applying roller 3a while the upstream end of the solid lubricant 3b in the surface moving direction of the applying roller 3a abuts the side surface of the housing case 3e located upstream in the surface moving direction of the applying roller 3a. Meanwhile, the swing members 301a supported swingably by the lubricant holding member 3d are also tilted counter clockwise in FIG. 19.

As the solid lubricant 3b is scraped, the tilt of the integrated body of the solid lubricant 3b, the lubricant holding member 3d, and the swing members 301a gradually increases in the housing case 3e. At the near-end of the solid lubricant 3b as illustrated in FIG. 21, the integrated body of the solid lubricant 3b, the lubricant holding member 3d, and the swing members 301a is greatly tilted. This greatly tilted posture is caused by the reduction of the height of the integrated body from the abutting area of the solid lubricant and the applying roller. As illustrated in FIG. 21, the difference increases in height of the solid lubricant 3b between an upstream part and a downstream part in the surface moving direction of the applying roller 3a.

When the first electrode member 41 is provided on the side surface of the housing case 3e located downstream in the surface moving direction of the applying roller 3a as illustrated in FIG. 21, the second electrode member 42 moves in a direction away from the first electrode member 41 due to the tilt of the integrated body (of the lubricant holding member 3d, the lubricant holding member, and the swing members 301a). This may cause the first electrode member 41 and the second electrode member 42 not to be abutted at the near-end of the solid lubricant 3b. As a result, the near-end detection may not be performed well. Consequently, the lubricant of the solid lubricant 3b located upstream in the surface moving direction of the applying roller 3a is exhausted, so that the applying roller 3a and the lubricant holding member 3d move while they are making a sliding contact with each other. As a result, the applying roller 3a may be damaged.

Figure 22A:
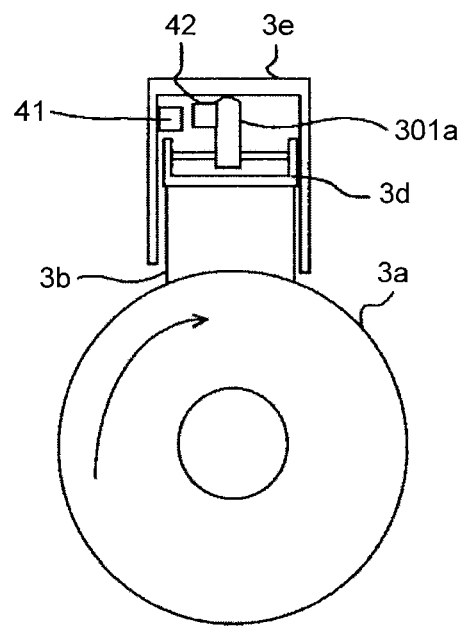
FIGS. 22A and 22B are schematic structural views of the lubricant applying device in which first electrode members are provided on a side surface of a housing case located upstream in a surface moving direction of an applying roller.
Figure 22B:
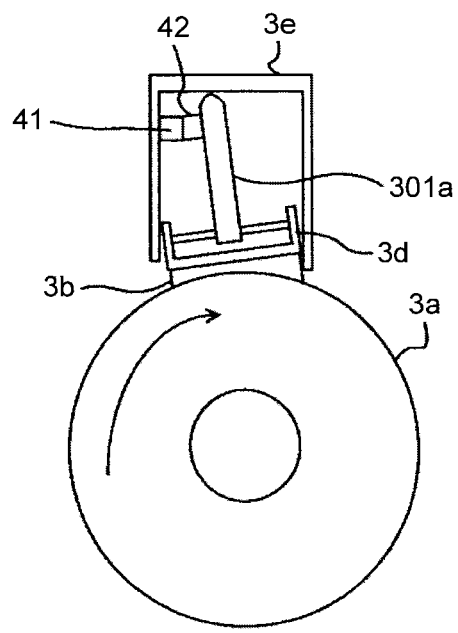

To prevent such a situation, the first electrode member 41 is preferably provided on the side surface of the housing case 3e located upstream in the surface moving direction of the lubricant applying roller 3a as illustrated in FIG. 22A. In the structure, in which the first electrode member 41 is provided on the side surface of the housing case 3e located upstream in the surface moving direction of the lubricant applying roller 3a, the second electrode member 42 provided on the swing member 301a moves in a direction approaching the first electrode member 41 as illustrated in FIG. 22B when the integrated body (of the solid lubricant 3b, the lubricant holding member 3d, and the swing members 301a) rotates counter clockwise in FIG. 22B due to the difference in height of the solid lubricant 3b between an upstream part and a downstream part in the surface moving direction of the applying roller 3a. Accordingly, the first electrode member 41 abuts the second electrode member 42 when the lubricant amount of the solid lubricant 3b at the upstream part in the surface moving direction of the applying roller 3a is equal to or smaller than a predetermined amount. As a result, it can be detected that the lubricant amount of the solid lubricant 3b at the upstream part in the surface moving direction of the applying roller 3a is equal to or smaller than the predetermined amount. The first electrode members 41 and the second electrode members 42 are arranged such that the corresponding first electrode member 41 and the corresponding second electrode member 42 are abutted when the lubricant amount of the solid lubricant 3b at the upstream part in the surface moving direction of the applying roller 3a is equal to or smaller than the predetermined amount, and the corresponding swing member 301a reaches a predetermined swing posture in the housing case 3e.

In the embodiment, the non-conduction state is established between the first electrode members 41 and the second electrode members 42 before the near-end of the lubricant, and thus no current flows even if a voltage is applied between the electrode members. As a result, no power is consumed at every detection of the near-end, thereby enabling power consumption to be reduced.

In the embodiment, the conduction states between the first electrode members and the second electrode members are detected near both ends in the longitudinal direction of the lubricant holding member 3d. Accordingly, even if the consumption of the lubricant differs in the longitudinal direction of the solid lubricant 3b, the second electrode member 42 near the end on a side in which the lubricant is much more consumed than the other side abuts the first electrode member 41 at the near-end of the much more consumed end, thereby establishing the conduction therebetween. As a result, the near-end of the lubricant can be accurately detected even if the consumption amount of the solid lubricant 3b differs in the longitudinal direction. As a result, occurrence of failures can be prevented, such as scratches on the surface of the photosensitive element occurring when no lubricant protection is provided to the surface of the photosensitive element on the side in which the lubricant is exhausted due to a large amount of consumption.

Figure 23:
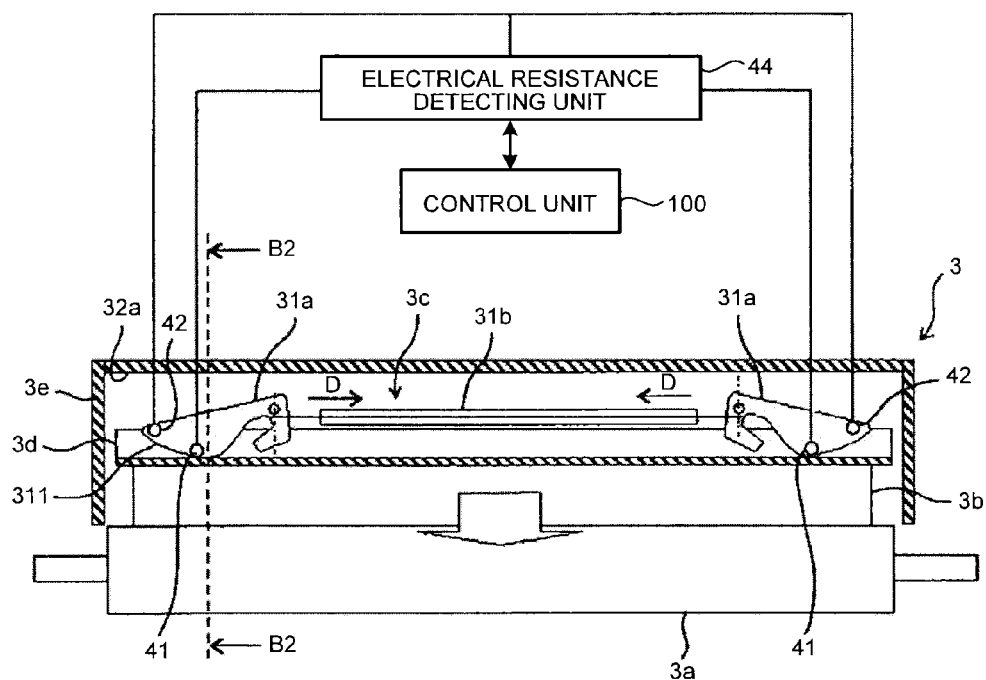
FIG. 23 is an explanatory view illustrating a schematic structure of the lubricant applying device obtained by adding the remaining amount detecting mechanism to the lubricant applying device including the pushing mechanism illustrated in FIG. 3.
Figure 24:
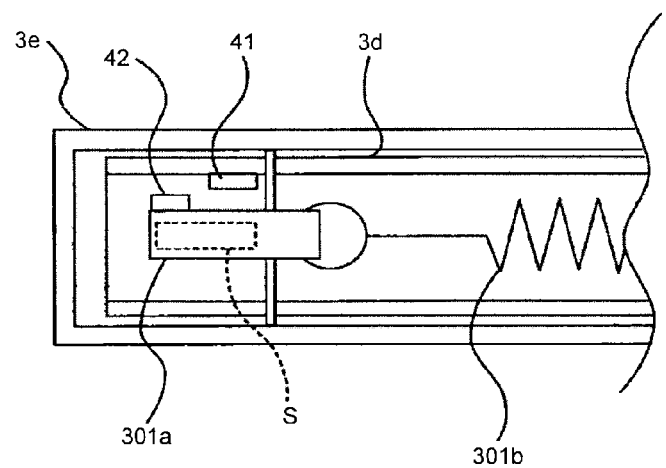
FIG. 24 is a top view of the vicinity of the swing member on one side of the lubricant applying device of FIG. 23.
Figure 25:
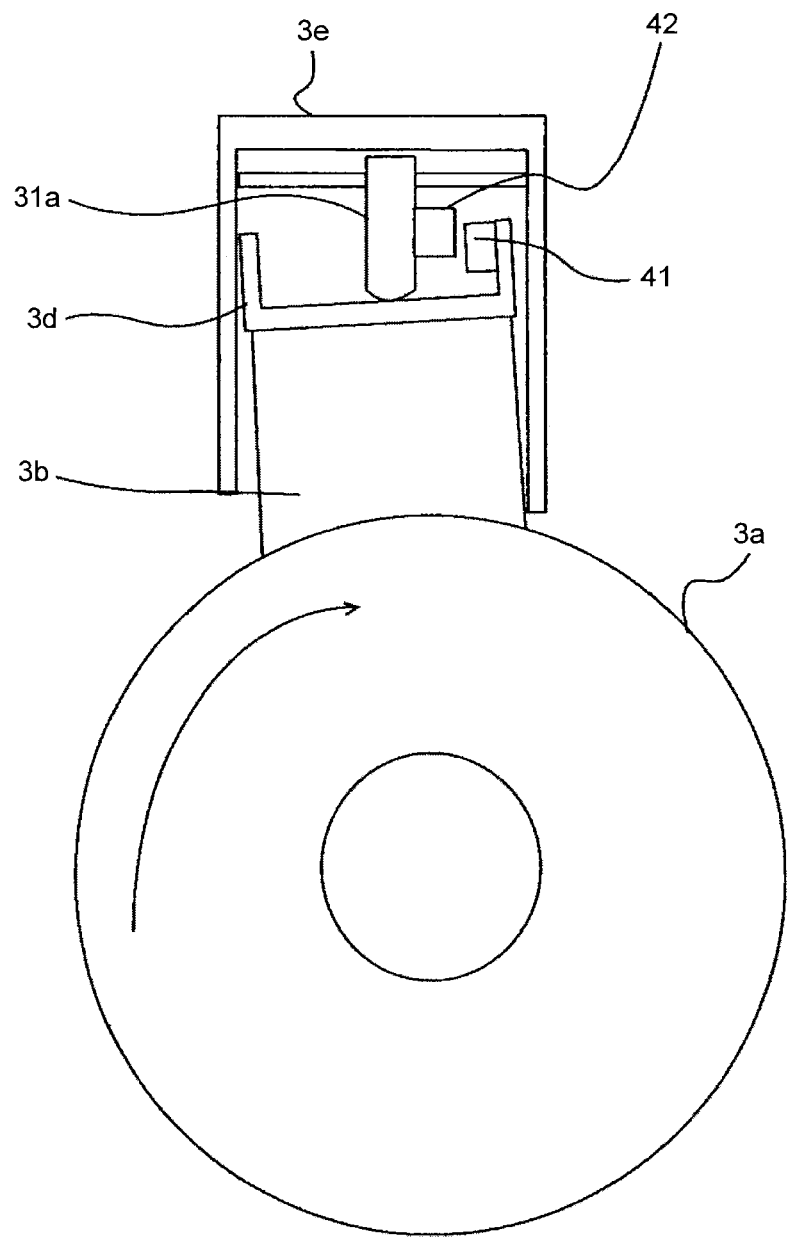
FIG. 25 is a sectional view along line B2-B2 of FIG. 23.

FIG. 23 is a schematic structural view illustrating a structure in which the remaining amount detecting mechanism 40 in the second embodiment is included in the lubricant applying device 3 including the pushing mechanism 3c illustrated in FIGS. 3 and 4. FIG. 24 is a top view illustrating the vicinity of the swing member 31a on one side of the lubricant applying device 3 of FIG. 23. FIG. 25 is a sectional view along line B2-B2 of FIG. 24.

In the structure illustrated in FIG. 23, the lubricant holding member 3d is the member on which the abutting portions 311 of the swing members 31a slide. The first electrode members 41 are provided on a side surface of the lubricant holding member 3d located downstream in the surface moving direction of the applying roller 3a and near both ends in the longitudinal direction of the lubricant holding member 3d.

Each of the second electrode members 42 is provided on the side surface of the corresponding swing member 31a located downstream in the direction in which the applying roller 3a rubs the solid lubricant 3b (the surface moving direction of the applying roller 3a) as illustrated in FIGS. 24 and 25. As illustrated in FIG. 23, each of the second electrode members 42 is disposed near the swing end of the corresponding swing member 301a.

Figure 26:
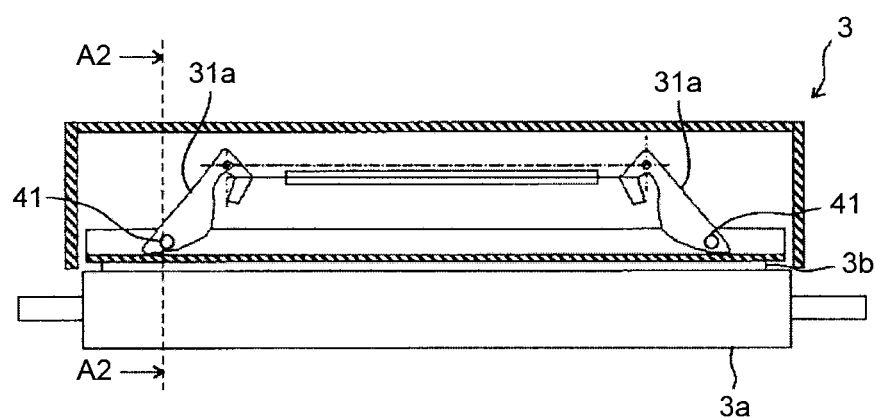
FIG. 26 is an explanatory view illustrating a state of the structure illustrated in FIG. 23 at the near-end of the solid lubricant.
Figure 27:
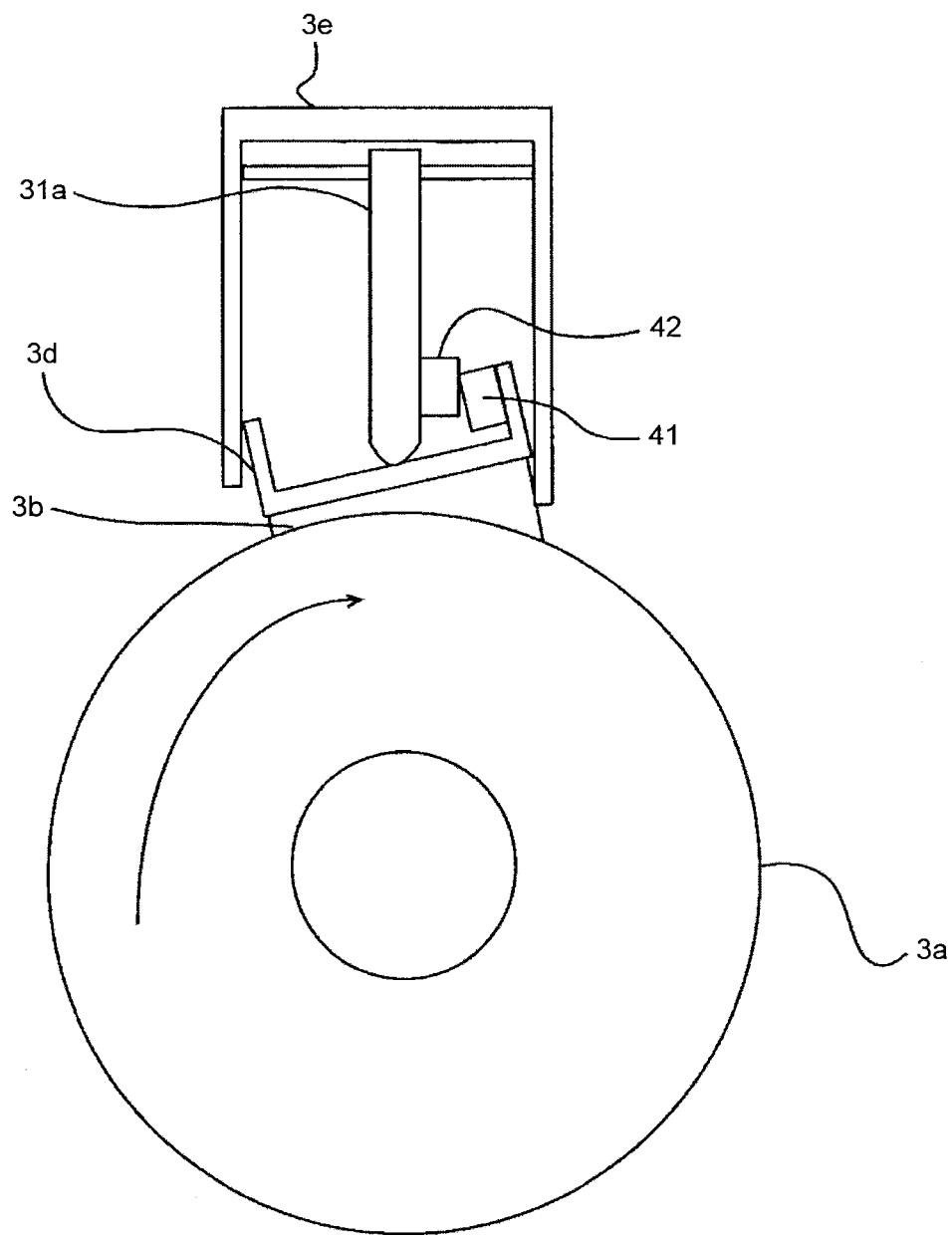
FIG. 27 is a sectional view along line A2-A2 of FIG. 26.
Figure 28A:
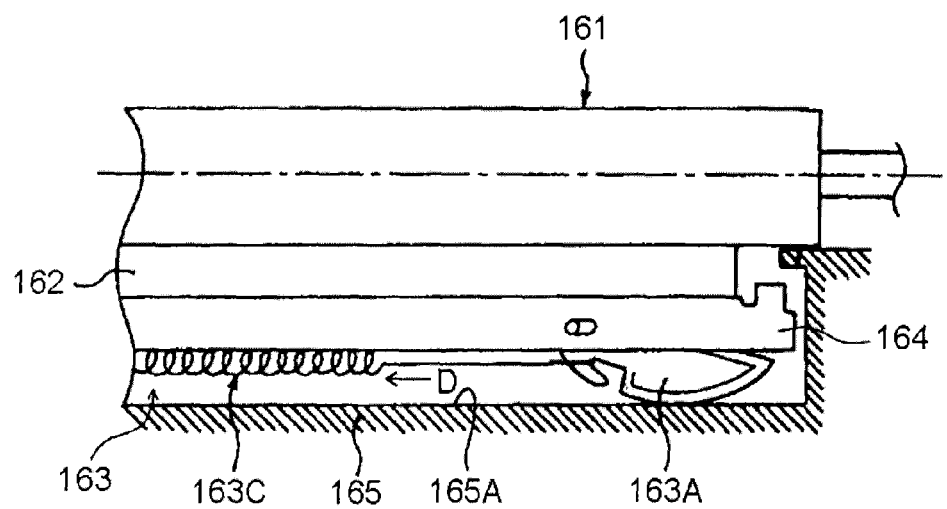
FIGS. 28A and 28B are schematic structural views illustrating a conventional lubricant supplying device.
Figure 28B:
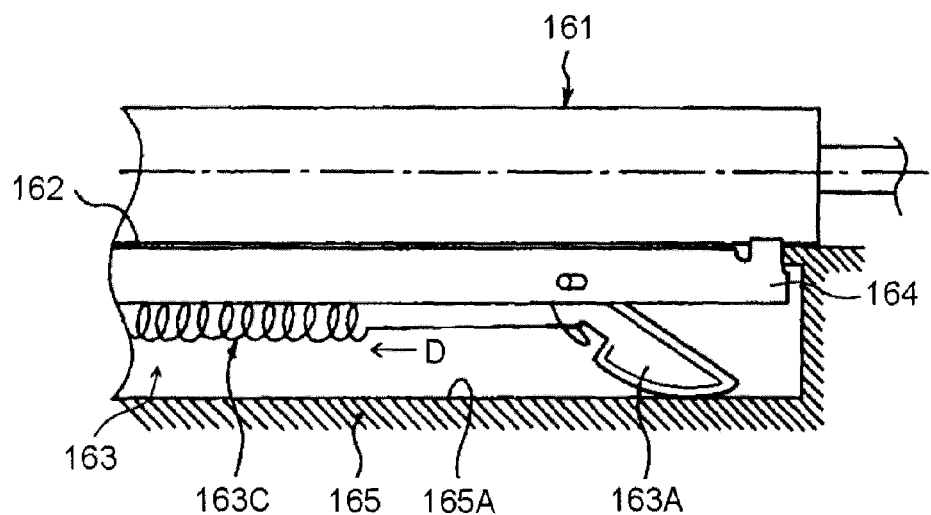
Figure 29:
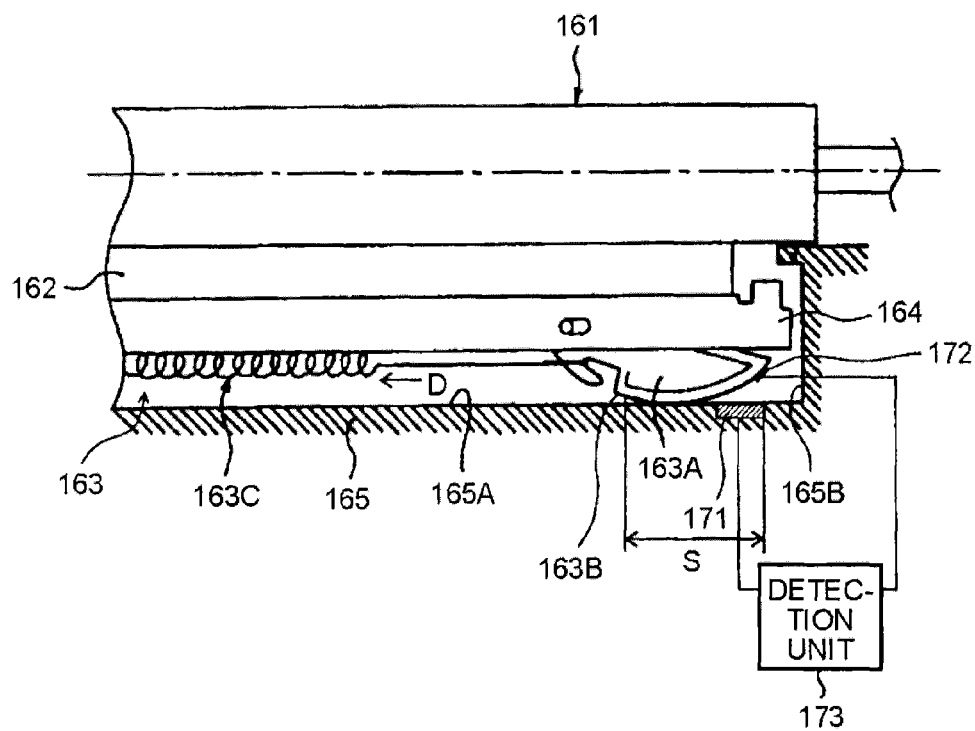
FIG. 29 is a schematic structural view illustrating another conventional lubricant supplying device.

FIG. 26 is a schematic diagram illustrating a state of the structure illustrated in FIG. 23 at the near-end of the solid lubricant 3b. FIG. 27 is a sectional view along line A2-A2 of FIG. 26.

In the structure illustrated in FIG. 23, the second electrode members 42 attached to the respective swing members 31a are away from the first electrode members 41 provided on the lubricant holding member 3d at the beginning of use as illustrated in FIG. 25. As the solid lubricant 3b is scraped and consumed, the swing members 301a swing while sliding on the lubricant holding member 3d, resulting in the second electrode members 42 gradually approaching the first electrode members 41. When the remaining amount of the solid lubricant 3b is small (the near-end) as illustrated in FIGS. 26 and 27, the second electrode members 42 abut the first electrode members 41. Once the second electrode members 42 abut the first electrode members 41, the non-conduction state between the first electrode members 41 and the second electrode members 42 turns to the conduction state. When the electrical resistance detecting unit 44 applies a voltage between the first electrode members 41 and the second electrode members 42, a current flows between the first electrode members 41 and the second electrode members 42, and thus the electrical resistance detecting unit 44 measures an electrical resistance value.

In the structure illustrated in FIG. 23, the first electrode members 41 are provided on the side surface of the lubricant holding member 3d on which the swing members 301a slide. Because of this structure, the abutting portions 311 of the swing members 301a do not slide on the first electrode members 41 even if the position of the lubricant holding member 3d shifts in the longitudinal direction or the short side direction during use. As a result, the respective swing members 301a swing in the same manner, thereby enabling a pushing force of the solid lubricant 3b against the applying roller 3a to be uniform in the longitudinal direction. Consequently, the lubricant can be applied uniformly to the photosensitive element 1 in the axial direction.

In the structure illustrated in FIG. 23, when the upstream part of the lubricant holding member 3d in the surface moving direction of the applying roller 3a is tilted so as to approach the applying roller 3a as illustrated in FIG. 27, the lubricant holding member 3d is tilted counter clockwise in FIG. 27. As a result, in the structure illustrated in FIG. 23, the side surface of the lubricant holding member 3d located downstream in the surface moving direction of the applying roller 3a approaches the swing members 31*a*. Hence, in the structure illustrated in FIG. 23, the second electrode members 42 can be reliably abutted to the first electrode members 41 even if the lubricant holding member 3*d* is tilted due to the faster consumption at the upstream part than at the downstream part of the solid lubricant 3*b* in the surface moving direction of the applying roller 3*a*, by providing the first electrode members 41 to the side surface of the lubricant holding member 3*d* located downstream in the surface moving direction of the applying roller 3*a*. As a result, the lubricant of the solid lubricant 3*b* located upstream in the surface moving direction of the applying roller 3*a* can be prevented from being exhausted.

In the structure illustrated in FIG. 23, the non-conduction state is established between the first electrode members 41 and the second electrode members 42 before the near-end of the lubricant, and thus no current flows even if a voltage is applied between the electrode members. As a result, no power is consumed at every detection of the near-end, thereby enabling power consumption to be reduced.

The above descriptions are represented by way of example. The second embodiment has particular effects in the following aspects (1) to (5) in addition to the effects of the first embodiment.

Aspect (1)

According to aspect (1) of the second embodiment, a lubricant supplying device is, for example, the lubricant applying device 3 that includes the solid lubricant 3*b*, a supplying member such as the applying roller 3*a* that abuts the solid lubricant 3*b*, scrapes the lubricant by making a sliding contact with and rubbing the solid lubricant 3*b*, and supplies the scraped lubricant to a lubricant supply target such as the photosensitive element 1, the lubricant holding member 3*d* that holds the solid lubricant 3*b*, the housing case 3*e* that houses the lubricant holding member 3*d* such that the lubricant holding member 3*d* can move toward the supplying member, the pushing mechanism 3*c* that includes a pair of swing members 31*a* swingably supported in the housing case and a biasing unit such as the spring 31*b* urging the swing members 31*a* to swing, and in which the swing members 31*a* swing while sliding on the inner surface of the housing case 3*e* or the lubricant holding member 3*d* by a biasing force of the biasing unit to push the lubricant holding member 3*d* toward the supplying member, and a remaining amount detecting unit such as the remaining amount detecting mechanism 40 that detects that a remaining amount of the solid lubricant 3*b* is equal to or smaller than a predetermined amount. In the lubricant supplying device, the remaining amount detecting unit includes first detection members such as the first electrode members 41 provided on the respective opposing surface that face the respective swing members 31*a* with a certain distance therebetween in a direction in which the supplying member rubs the solid lubricant of a member on which the swing members 31*a* slide when swinging, and second detection members such as the second electrode members 42 attached to the respective swing members such that the second electrode members 42 face the respective first detection members when the swing postures of the corresponding swing members 31*a* reach the corresponding swing postures corresponding to that the remaining amount of the solid lubricant is the predetermined amount.

In the lubricant supplying device thus structured, the swing members do not slide on the first electrode members even if the sliding areas of the member on which the swing members slide (housing case or lubricant holding member) shift in the longitudinal direction, as described in the embodiment. This makes it possible to push the solid lubricant 3*b* to the supplying member uniformly in the longitudinal direction of the solid lubricant 3*b*. As a result, the lubricant can be uniformly supplied to the lubricant supply target such as the photosensitive element 1.

Aspect (2)

In the lubricant supplying device described in aspect (1), the swing members are swingably attached to the lubricant holding member, the member on which the swing members slide while swinging is the housing case, and the first detection members are provided on the side surface of the housing case located upstream in the direction in which the supplying member rubs the solid lubricant.

In the lubricant supplying device thus structured, the solid lubricant is faster scraped at the upstream part than the downstream part in the direction in which the supplying member rubs the solid lubricant, and the swing members are tilted together with the lubricant holding member, so that the second electrode members 42 provided on the swing members approach the first electrode members 41, as illustrated in FIG. 22B. As a result, the first electrode members and the second electrode members can be abutted when the solid lubricant is faster scraped at the upstream part than the downstream part in the direction in which the supplying member rubs the solid lubricant, and the amount of the solid lubricant at the upstream part in the direction in which the supplying member rubs the solid lubricant is equal to or smaller than a predetermined amount. Consequently, the lubricant of the solid lubricant 3*b* located upstream in the surface moving direction of the supplying member can be prevented from being exhausted.

Aspect (3)

In the lubricant supplying device described in aspect (1), the swing members are swingably attached to the housing case, the member on which the swing members slide while swinging is the lubricant holding member, and the first detection members are provided on the side surface of the lubricant holding member located downstream in the direction in which the supplying member rubs the solid lubricant.

In the lubricant supplying device thus structured, the solid lubricant is faster scraped at the upstream part than the downstream part in the direction in which the supplying member rubs the solid lubricant, and the lubricant holding member is tilted, so that the first electrode members 41 provided on the lubricant holding member approach the second electrode members 42, as illustrated in FIG. 27. As a result, the first electrode members and the second electrode members can be abutted when the solid lubricant is faster scraped at the upstream part than the downstream part in the direction in which the supplying member rubs the solid lubricant, and the amount of the solid lubricant at the upstream part in the direction in which the supplying member rubs the solid lubricant is equal to or smaller than a predetermined amount. Consequently, the lubricant of the solid lubricant 3*b* located upstream in the surface moving direction of the supplying member can be prevented from being exhausted.

Aspect (5)

In the lubricant supplying device described in any of aspects (1) to (5), a roller member made of polyurethane foam is used as the supplying member.

The supplying member thus structured has a higher capability of removing foreign materials adhering on the lubricant supply target such as the photosensitive element than that of the brush roller, when the lubricant is supplied to the photosensitive element. This makes it possible to protect the lubricant supply target well even if the lubricant supply amount to the lubricant supply target is reduced by 30 to 50% as compared with that of the brush roller. As a result, the lubricant consumption can be reduced.

The embodiment, in which the first detection members are provided at the respective positions different from the respective sliding areas on which the respective swing members slide, can provide the following advantages. When the first detection members are provided at the respective position different from the respective sliding areas in the short side direction of the solid lubricant, the first detection members and the swing members are not abutted even if the positions of the swing members shift in the longitudinal direction of the solid lubricant as a result of the shifting of the lubricant holding member in the longitudinal direction. When the first detection members are provided at the respective positions different from the respective sliding areas in the longitudinal direction of the solid lubricant, the swing members can be prevented from abutting the first detection members at the shifting of the swing members in the longitudinal direction of the solid lubricant unlike the prototype in which the first detection members are provided in the sliding areas.

This structure can prevent a difference in swing amount from occurring between one swing member and the other swing member, thereby enabling the solid lubricant to abut the supplying member with uniform abutting pressure in the longitudinal direction. As a result, an amount of the lubricant scraped by the supplying member can be made uniform in the longitudinal direction, thereby enabling the lubricant to be supplied uniformly to the supply target.

When the first detection members are provided in the sliding areas, only a structure is adoptable in which the second detection members provided on the swing members abut the first detection members in the case where the amount of the lubricant is equal to or smaller than a predetermined amount because the swing members abut the first detection members in the case where the amount of the lubricant is equal to or smaller than the predetermined amount. In the invention, the swing members do not abut the first detection members in the case where the amount of the lubricant is equal to or smaller than a predetermined amount because the first detection members are provided at the respective positions different from the respective sliding areas. Thus, a structure is also adoptable in which the second detection members face the first detection members besides the structure in which the second detection members provided on the swing members abut the first detection members, when the amount of the lubricant is equal to or smaller than a predetermined amount.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lubricant supplying device, comprising:
   lubricant;
   a supplying member that supplies the lubricant to a lubricant supply target;
   a housing case that houses the lubricant;
   a pushing mechanism that includes a pair of swing members supported swingably in the housing case and a biasing unit urging the pair of swing members to swing, and in which the swing members swing while sliding on an inner surface of the housing case by a biasing force of the biasing unit to push the lubricant to the supplying member; and
   a remaining amount detecting unit that detects that a remaining amount of the lubricant is equal to or smaller than a predetermined amount, wherein
   the remaining amount detecting unit includes:
      first detection members provided at respective positions different from respective sliding areas of the inner surface on which the swing members slide, and
      second detection members attached to the respective swing members such that the second detection members abut or face the respective first detection members when swing postures of the respective swing members reach respective swing postures corresponding to the remaining amount of the lubricant is the predetermined amount.

2. The lubricant supplying device according to claim 1, wherein the first detection members are arranged at respective positions shifted from the respective sliding areas on which the respective swing members slide, in a direction perpendicular to both of a longitudinal direction of the lubricant and a direction along which the lubricant is pushed and moved.

3. The lubricant supplying device according to claim 1, wherein
   the first and the second detection members are electrode members, and abutted when the swing postures of the respective swing members reach the respective swing postures corresponding to the remaining amount of the lubricant is the predetermined amount, and
   the remaining amount detecting unit detects the remaining amount of the lubricant by applying a voltage between the respective first detection members and the respective second detection members and detecting a conduction state between the electrodes.

4. The lubricant supplying device according to claim 1, wherein
   the first detection members are provided on an opposing surface portion of the inner surface on which the swing members slide, the opposing surface portion facing the swing members with a certain distance in a direction in which the supplying member rubs the lubricant, and
   the second detection members are attached to the respective swing members such that the second detection members face the respective first detection members when the swing postures of the respective swing members reach the respective swing postures corresponding to the remaining amount of the lubricant is the predetermined amount.

5. The lubricant supplying device according to claim 1, wherein the first detection members are provided on an opposing surface portion of the housing case located upstream in a direction in which the supplying member rubs the lubricant.

6. The lubricant supplying device according to claim 1, wherein the first detection members are provided on an opposing surface portion located downstream in a direction in which the supplying member rubs the lubricant in the housing holding the lubricant.

7. The lubricant supplying device according to claim 1, wherein the lubricant contains a fatty acid metal salt.

8. The lubricant supplying device according to claim 1, wherein the lubricant contains inorganic lubricant.

9. The lubricant supplying device according to claim 8, wherein the inorganic lubricant is boron nitride.

10. An image forming apparatus, comprising:
    an image carrier; and
    a lubricant supplying unit that supplies lubricant on a surface of the image carrier, wherein the lubricant supplying unit is a lubricant supplying device including:
  lubricant;
  a supplying member that supplies the lubricant to a lubricant supply target;
  a housing case that houses the lubricant;
  a pushing mechanism that includes a pair of swing members supported swingably in the housing case and a biasing unit urging the pair of swing members to swing, and in which the swing members swing while sliding on an inner surface of the housing case by a biasing force of the biasing unit to push the lubricant to the supplying member; and
  a remaining amount detecting unit that detects that a remaining amount of the lubricant is equal to or smaller than a predetermined amount, the remaining amount detecting unit including:
    first detection members provided at respective positions different from respective sliding areas of the inner surface on which the swing members slide, and
    second detection members attached to the respective swing members such that the second detection members abut or face the respective first detection members when swing postures of the respective swing members reach respective swing postures corresponding to the remaining amount of the lubricant is the predetermined amount.

11. A process cartridge, comprising:
an image carrier; and
a lubricant supplying unit that supplies lubricant to a surface of the image carrier, wherein
the process cartridge is attachable to and detachable from an image forming apparatus body, and
the lubricant supplying unit is a lubricant supplying device includes:
  lubricant;
  a supplying member that supplies the lubricant to a lubricant supply target;
  a housing case that houses the lubricant;
  a pushing mechanism that includes a pair of swing members supported swingably in the housing case and a biasing unit urging the pair of swing members to swing, and in which the swing members swing while sliding on an inner surface of the housing case by a biasing force of the biasing unit to push the lubricant to the supplying member; and
  a remaining amount detecting unit that detects that a remaining amount of the lubricant is equal to or smaller than a predetermined amount, the remaining amount detecting unit including:
    first detection members provided at respective positions different from respective sliding areas of the inner surface on which the swing members slide, and
    second detection members attached to the respective swing members such that the second detection members abut or face the respective first detection members when swing postures of the respective swing members reach respective swing postures corresponding to the remaining amount of the lubricant is the predetermined amount.

* * * * *